(12) United States Patent
Mather et al.

(10) Patent No.: US 8,683,798 B2
(45) Date of Patent: Apr. 1, 2014

(54) STIMULI-RESPONSIVE PRODUCT

(75) Inventors: Patrick Mather, Manlius, NY (US); Xiaofan Luo, Cleveland, OH (US)

(73) Assignee: Syracuse University, Syracuse, NY (US)

( * ) Notice: Subject to any disclaimer, the term of this patent is extended or adjusted under 35 U.S.C. 154(b) by 329 days.

(21) Appl. No.: 13/006,024

(22) Filed: Jan. 13, 2011

(65) Prior Publication Data

US 2011/0173971 A1 Jul. 21, 2011

Related U.S. Application Data

(60) Provisional application No. 61/295,214, filed on Jan. 15, 2010.

(51) Int. Cl.
| | | |
|---|---|---|
| F01B 29/00 | (2006.01) | |
| B05D 5/04 | (2006.01) | |
| B05D 3/00 | (2006.01) | |

(52) U.S. Cl.
USPC ............... 60/528; 60/527; 427/113; 427/221; 427/339; 977/742; 977/932

(58) Field of Classification Search
USPC .......................................................... 60/528
See application file for complete search history.

(56) References Cited

U.S. PATENT DOCUMENTS

| | | | |
|---|---|---|---|
| 692,631 A | 2/1902 | Cooley | |
| 705,691 A | 7/1902 | Morton | |
| 1,975,504 A | 10/1934 | Formhals | |
| 2,048,651 A | 7/1936 | Norton | |
| 2,349,950 A | 5/1944 | Formhals | |
| 4,472,228 A | 9/1984 | Yoshimura et al. | |
| 4,505,797 A * | 3/1985 | Hodgdon et al. | 204/252 |
| 4,832,870 A * | 5/1989 | Clough et al. | 252/511 |
| 5,470,893 A | 11/1995 | Sinclair-Day et al. | |
| 5,561,173 A | 10/1996 | Dry | |
| 5,660,624 A | 8/1997 | Dry | |
| 5,803,963 A | 9/1998 | Dry | |
| 5,989,334 A | 11/1999 | Dry | |
| 6,048,622 A * | 4/2000 | Hagood et al. | 428/461 |
| 6,075,072 A | 6/2000 | Guilbert et al. | |
| 6,261,360 B1 | 7/2001 | Dry | |
| 6,326,432 B1 | 12/2001 | Fujita et al. | |
| 6,518,330 B2 | 2/2003 | White et al. | |
| 6,527,849 B2 | 3/2003 | Dry | |
| 6,713,011 B2 | 3/2004 | Chu et al. | |
| 6,759,117 B2 | 7/2004 | Bauer et al. | |

(Continued)

OTHER PUBLICATIONS

Review of electro-active shape memory polymer composite by Liu et al.*

(Continued)

*Primary Examiner* — Thomas Denion
*Assistant Examiner* — Jessica Kebea
(74) *Attorney, Agent, or Firm* — David L. Cocilly; Bond Schoeneck & King, PLLC

(57) ABSTRACT

Embodiments of a product such as a stimuli-responsive product can comprise a shape memory component and a nanofiber component that forms a fibrous microstructure or network. The resulting product can be responsive to stimuli, such as electrical stimuli, in a manner that cause the product to deform, deflect, and rebound. In one embodiment, the product can comprise an epoxy and a continuous non-woven nanofiber, the combination of which provides a product with enhanced actuation speed.

20 Claims, 13 Drawing Sheets

(56) References Cited

U.S. PATENT DOCUMENTS

| | | | |
|---|---|---|---|
| 6,808,461 B2 | 10/2004 | Harris et al. | |
| 6,858,659 B2 | 2/2005 | White et al. | |
| 6,858,660 B1 | 2/2005 | Scheifers et al. | |
| 6,989,426 B2 | 1/2006 | Hu et al. | |
| 6,994,723 B1 | 2/2006 | McMahon | |
| 7,022,179 B1 | 4/2006 | Dry | |
| 7,091,297 B2 | 8/2006 | Mather et al. | |
| 7,104,317 B2 | 9/2006 | Richard et al. | |
| 7,108,914 B2 | 9/2006 | Skipor et al. | |
| 7,188,678 B2 | 3/2007 | Richard et al. | |
| 7,279,523 B2 | 10/2007 | Ando et al. | |
| 7,342,057 B2 | 3/2008 | Kumar et al. | |
| 7,478,845 B2 | 1/2009 | Mankame et al. | |
| 7,488,523 B1 | 2/2009 | Muncaster et al. | |
| 7,524,914 B2 | 4/2009 | Mather et al. | |
| 7,566,747 B2 | 7/2009 | Moore et al. | |
| 7,569,625 B2 | 8/2009 | Keller et al. | |
| 7,678,440 B1* | 3/2010 | McKnight et al. | 428/116 |
| 7,689,260 B2 | 3/2010 | Finch et al. | |
| 7,892,630 B1* | 2/2011 | McKnight et al. | 428/212 |
| 2001/0050032 A1 | 12/2001 | Dry | |
| 2003/0107148 A1* | 6/2003 | Davis et al. | 264/112 |
| 2003/0214064 A1* | 11/2003 | Shin et al. | 264/29.7 |
| 2004/0116641 A1* | 6/2004 | Mather et al. | 528/28 |
| 2004/0241436 A1* | 12/2004 | Hsieh et al. | 428/361 |
| 2005/0156328 A1 | 7/2005 | Luo et al. | |
| 2005/0230195 A1 | 10/2005 | Jones et al. | |
| 2005/0245719 A1 | 11/2005 | Mather et al. | |
| 2005/0255312 A1* | 11/2005 | Fujihara et al. | 428/323 |
| 2006/0169180 A1 | 8/2006 | Dry | |
| 2006/0177379 A1* | 8/2006 | Asgari | 424/9.3 |
| 2006/0252852 A1 | 11/2006 | Braun et al. | |
| 2007/0087198 A1 | 4/2007 | Dry | |
| 2007/0166542 A1 | 7/2007 | Braun et al. | |
| 2007/0223773 A1 | 9/2007 | Tripp et al. | |
| 2007/0247033 A1 | 10/2007 | Eidenschink et al. | |
| 2008/0047472 A1 | 2/2008 | Dry | |
| 2008/0050612 A1 | 2/2008 | Dry | |
| 2008/0053338 A1 | 3/2008 | Dry | |
| 2008/0057296 A1 | 3/2008 | Dry | |
| 2008/0058445 A1 | 3/2008 | Dry | |
| 2008/0075940 A1* | 3/2008 | Schafer et al. | 428/220 |
| 2008/0083286 A1 | 4/2008 | Danowski et al. | |
| 2008/0097606 A1 | 4/2008 | Cragg et al. | |
| 2008/0107888 A1 | 5/2008 | Dry | |
| 2008/0113573 A1 | 5/2008 | Acosta et al. | |
| 2008/0116415 A1 | 5/2008 | Wang et al. | |
| 2008/0170982 A1* | 7/2008 | Zhang et al. | 423/447.3 |
| 2008/0179782 A1* | 7/2008 | Liu et al. | 264/211 |
| 2008/0249221 A1 | 10/2008 | Corkery et al. | |
| 2008/0249245 A1 | 10/2008 | Mather et al. | |
| 2008/0287582 A1 | 11/2008 | Weiss | |
| 2009/0068461 A1* | 3/2009 | Reneker et al. | 428/366 |
| 2009/0117268 A1* | 5/2009 | Lewis et al. | 427/205 |
| 2009/0171388 A1* | 7/2009 | Dave et al. | 606/213 |
| 2009/0294022 A1* | 12/2009 | Hayes et al. | 156/94 |
| 2010/0028674 A1 | 2/2010 | Ochanda | |
| 2010/0119704 A1* | 5/2010 | Hemmelgarn et al. | 427/140 |
| 2010/0144962 A1 | 6/2010 | Jana et al. | |
| 2010/0198257 A1 | 8/2010 | Stopek et al. | |
| 2010/0221517 A1* | 9/2010 | Swift et al. | 428/220 |
| 2010/0247909 A1 | 9/2010 | Lee et al. | |
| 2010/0255581 A1 | 10/2010 | Naqvi et al. | |
| 2010/0282906 A1* | 11/2010 | Sanderson et al. | 244/123.1 |
| 2011/0021097 A1* | 1/2011 | Mather et al. | 442/60 |
| 2011/0151254 A1* | 6/2011 | Fugetsu et al. | 428/368 |
| 2011/0217547 A1* | 9/2011 | Mather et al. | 428/339 |
| 2012/0303056 A1* | 11/2012 | Li et al. | 606/213 |

OTHER PUBLICATIONS

Electroactivate shape-memroy filled with nanocarbon particles and short carbon fibers by Leng et al.*

"Improved bonding between PAN-cased carbon fibers and fullerene-modified epoxy matrix" Jiang Auguast 30, 2008.*

"Investigate of Electrical Conductivity of Shape Memory Polymer Filled with Carbon Black" Lan et al. 2008.*

International Searching Authority/US, International Search Report and Written Opinion, mailed Feb. 5, 2010, 6 pages.

Conductive Shape Memory Nanocomposites for High Speed Electrical Actuation, Xiaofan Luo, Patrick T. Mather, First Published as an Advanced Article on the web, Apr. 19, 2010, Soft Matter, 2010, 6 pages, 2146-2149.

Polyacrylonitrile-Based Carbon Nanofibers Prepared by Electrospinning, Shivalingappa Lingaiah et al., Center for Composite Materials Research, 11 pages.

Welded Electrochromic Conductive Polymer Nanofibers by Electrostatic Spinning, Sung-Yeon Jang, et al., Adv. Mater. 2005, pp. 2177-2180.

* cited by examiner

APPENDIX A

APPENDIX B

APPENDIX C

APPENDIX D

APPENDIX E

APPENDIX F

APPENDIX G

APPENDIX H

STIMULI-RESPONSIVE PRODUCT

CROSS-REFERENCE TO RELATED APPLICATIONS

This application claims the benefit under 35 U.S.C. §119 (e) to U.S. Provisional Patent Application Ser. No. 61/295,214, entitled "Stimuli-Responsive Material" and filed on Jan. 15, 2010 (hereinafter, "the Provisional Application"). The content of the Provisional Application is incorporated by reference in its entirety herein.

BACKGROUND

1. Technical Field of the Disclosure

The present disclosure relates generally to stimuli-responsive materials, and more particularly, to embodiments of a shape-memory product, where one embodiment comprises a matrix component such as epoxy and a filler component in the form of a network of nanofibers that interpenetrates the matrix component and conducts electrical stimuli thereon.

2. Description of Related Art

As discussed in the Provisional Application, shape memory polymers (SMPs) are stimuli-responsive materials that have the ability to change shapes on demand.[1-5] Although having a number of intrinsic advantages such as large deformation strain (actuation amplitude), low density and low manufacturing cost, some major limitations of SMPs are still present and impose great challenges to their large-scale applications.[4, 6] Some of the key limitations include (1) small recovery stresses due to low rubbery moduli (0.1~10 MPa), (2) low recovery speed, primarily due to poor thermal conductivities, and (3) inertness to electromagnetic stimuli (in contrast with shape memory alloys or SMAs), due to the insulating nature of most polymeric materials.

Research efforts have been undertaken in response to these challenges. For example, with regard to challenge (3) listed above, electro-active materials systems have been developed[7] by combining SMPs with conductive fillers including carbon black,[8-11] carbon nanotubes (CNTs),[12, 13] short carbon fibers,[8, 10, 14] nickel,[9, 15] and polypyrrole.[13, 16]

There is a need, therefore, for shape memory materials and products with improved conductivity and recovery performance.

SUMMARY

The present disclosure proposes the fabrication of embodiments of a product such as a new shape-memory nano-composite. These products solve many of the above-mentioned problems and have improved electrical actuation capabilities. In contrast to some conducting SMP systems, in which discrete fillers are blended into an SMP matrix, embodiments of the disclosed materials and products can comprise a matrix component and a filler component comprising continuous non-woven fibers such as carbon nanofibers (CNFs).

The non-woven fibers have a fiber morphology and size that form a fiber network. This network improves the electrical conductivity of the resulting product. Moreover, the fiber network creates a large matrix-filler interface, through which heat is conducted to the matrix component, thereby resulting in high actuation speed of the product.

In one embodiment, a product responsive to a stimuli comprises a first component comprising a shape-memory material and a second component arranged as a network of fibers disposed in the shape memory material, the fibers forming a stimuli path configured to conduct an electrical signal.

In another embodiment, a shape-memory product comprises a shape memory material and a filler combined with the matrix, the filler comprising nanofibers arranged as a fiber network. The shape-memory product also comprises a pair of electrodes in electrical communication with the fiber network, wherein the nanofibers are configured to conduct an electrical signal between the electrodes via the fiber network.

In yet another embodiment, a method comprises forming a filler component comprising one or more nanofibers, infiltrating the filler component with a matrix component, and curing the matrix component.

BRIEF DESCRIPTION OF THE DRAWINGS

So that the manner in which the above recited features of the present disclosure can be understood in detail, a more particular description of the embodiments briefly summarized above, may be had by reference to the drawings some of which are illustrated and described in the accompanying figures. It is to be noted, however, that the appended figures illustrate only typical embodiments of this disclosure and are therefore not to be considered limiting of its scope, for the embodiments may admit to other equally effective embodiments. Moreover, any drawings are not necessarily to scale, emphasis generally being placed upon illustrating the principles of certain embodiments of disclosure.

Thus, for further understanding of the nature and objects of the disclosure, references can be made to the following detailed description, read in connection with the drawings in which.

Where applicable like numerals are used to identify like components as between the embodiments.

DETAILED DESCRIPTION

Materials of the present disclosure comprise two components: a matrix component and a filler component that is embedded or otherwise disposed in the matrix component. In one embodiment, the matrix component exhibits shape-memory properties such as would be found in connection with a shape-memory polymer. An example of the shape memory polymer is epoxy and its derivatives. The filler component interpenetrates the matrix component and is configured to conduct electrical stimuli and to facilitate thermal heating of the matrix component. Thermal heating activates or initiates the shape-memory properties of the matrix component, thereby causing in one example changes to the shape of a product that is constructed of the materials disclosed below.

The discussion that follows is broken into five sections, which include (1) Embodiments of the Provisional Application, (2) Related Embodiments, (3) Experimental Results, (4) Comparative Results, and (5) Additional Embodiments.

(1) Embodiments of the Provisional Application

Embodiments of the disclosed materials were discussed in the Provisional Application. As mentioned above, the content of the Provisional Application is incorporated by reference herein. Reference to its disclosure is made in the discussion that follows to clarify the concepts prevailing at the time application for patent was made and to ground the discussion presented in the section entitled Related Embodiments and Additional Embodiments. Additional information from the Provisional Application is in the section entitled Experimental Results and Comparative Results.

Figure 1:
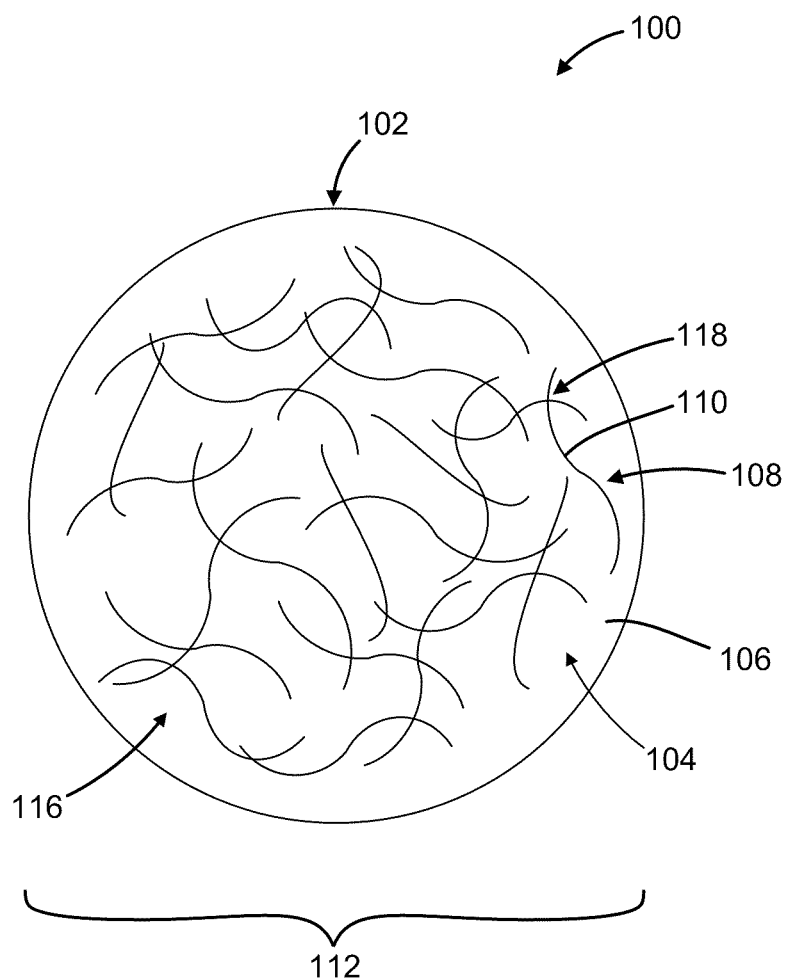
FIG. 1 is a side, cross-section view an exemplary embodiment of a stimuli-responsive product.

FIG. 1 depicts Appendix A of the Provisional Application, which illustrates an exemplary embodiment of a product 100.

Broadly stated, there is provided in the present disclosure embodiments of a product with a composition configured with improved properties including thermomechanical properties such as improved recovery rate. These improvements are beneficial because products of the type contemplated herein can exhibit recovery properties in response to stimuli such as electrical stimuli. These recovery properties are useful for a variety of implementations. These implementations include use in and for actuators, sensors, heaters that can heat in any geometry, toys, and medical devices.

In contrast to existing conductive SMPs in which there is provided discrete fillers such as carbon black, carbon nanotubes, nickel powders, and chopped short carbon fibers, embodiments of these products can comprise continuous non-woven carbon nanofibers and an "inside-out" fabrication method. These concepts have significant advantages including (1) much higher electrical conductivity due to the pre-defined percolating carbon fiber network, (2) significantly higher recovery/actuation speed which may be a result of (1), and (3) a much simpler processing/fabrication method that has no issues with filler aggregation, which can happen with discrete, nano-sized fibers.

One embodiment of products of the present disclosure is illustrated in Appendix A [FIG. 1] and discussed in more detail below. There is shown in Appendix A [FIG. 1], for example, one exemplary embodiment of a product 100, which can comprise a composition 102 with a first component 104 such as a shape memory component 106 and a second component 108 such as a nanofiber component 110 dispersed in and intermixed with the shape memory component 106. This intermixing can form a pre-determined network 112, which can be characterized in the present example as a percolating fiber network 114 with a plurality of fibers 116 that can be adjoined, such as at nodes 118 of the percolating fiber network 114.

In one embodiment of the product 100, the nanofiber component 110 can comprise various nanofibers, carbon nanofibers such as continuous non-woven carbon nanofibers ("CNFs"), and other materials, derivations, and combinations thereof. Nanofibers like the CNFs and similar aggregations can further be constructed and formed of building block components. One exemplary construction can comprise poly (acrylonitrile) ("PAN"), which is discussed in connection with the embodiment of product 100 discussed in the [Experimental Results] below. Moreover, other components both for use in and as the nanofiber component 110 can be selected to cause the product 100 to exhibit certain properties (e.g., mechanical, chemical, thermal, electrical). In one example, the materials selected and utilized to form the pre-determined network 112 can improve the electrical conductivity of the product 100, while also modifying, enhancing, and improving the heat transfer, and overall actuation speed of the product 100. The actuation speed, details provided in the [Experimental Results and Comparative Results] below, can be quantified variously, and in context of the present embodiment the actuation speed of products like product 100 can be such that the product 100 is suitable for high-speed and ultra-high speed applications (e.g., actuators, sensors, smart flexible heaters, toys, and medical devices).

In one embodiment of the product 100, the shape memory component 106 can comprise shape memory polymers and shape memory nanocomposites such as shape memory elastomeric composites ("SMECs"), nanofiber ion-exchange membranes, and transparent Nylon-4,6/epoxy composites. Epoxy and similar epoxy-based materials can also be used in whole or in part to form the shape memory component 106. One exemplary construction can comprise a matrix (e.g., an SMP matrix) such as the SMP matrix provided in connection with the embodiment of product 100 discussed in the [Experimental Results] below. Moreover, and to provide a clear and consistent understanding of the present disclosure, it is understood that a polymer and/or polymeric materials (hereinafter, "polymers") such as those used in embodiments of the product 100 can be substances that can comprise repeating structural units, and in one example the polymers can contain more than 100 repeating units. Polymers can also include those materials that comprise soluble and/or fusible molecules having long chains of repeat units. Polymers such as the polymers contemplated herein can also include materials that comprise insoluble and infusible networks.

Manufacturing processes, methods, and techniques can comprise those disclosed in, for example, the Experimental Results and incorporated herein. Other manufacturing processes can comprise vacuum bagging techniques.

In one embodiment, there is also provided a product comprising: a first component comprising a nanofiber component; and a second component comprising an epoxy, wherein the nanofiber component comprises a plurality of fibers that form a percolating network in the epoxy, and wherein the combination of the percolating network and the epoxy form a composition that exhibits a recovery property in response to electrical stimulation.

Materials, compositions, and composites (collectively, "materials") identified herein are not limiting, but rather are provided to form a basis for the various materials that can be used in products such as the product 100 discussed above. Also contemplated are derivations and compositions of such materials that fall within the scope of the present disclosure. Suitable derivations exhibit or cause the product to exhibit one or more of the properties discussed herein. These derivations can be made by changing one or more of the building block components such as is known and recognized by artisans skilled in the chemical and material arts.

(2) Related Embodiments

The features of stimuli-responsive products (e.g., the product 100) discussed in the Provisional Application are found in products and/or materials that the inventors identify as having beneficial characteristics and which exhibit shape-memory properties indicative of, e.g., the composition 102. The embodiments discussed below include examples of the composition 102, and thereby benefit from, are closely related to, and are supported by the broader concepts of the Provisional Application.

Figure 2:
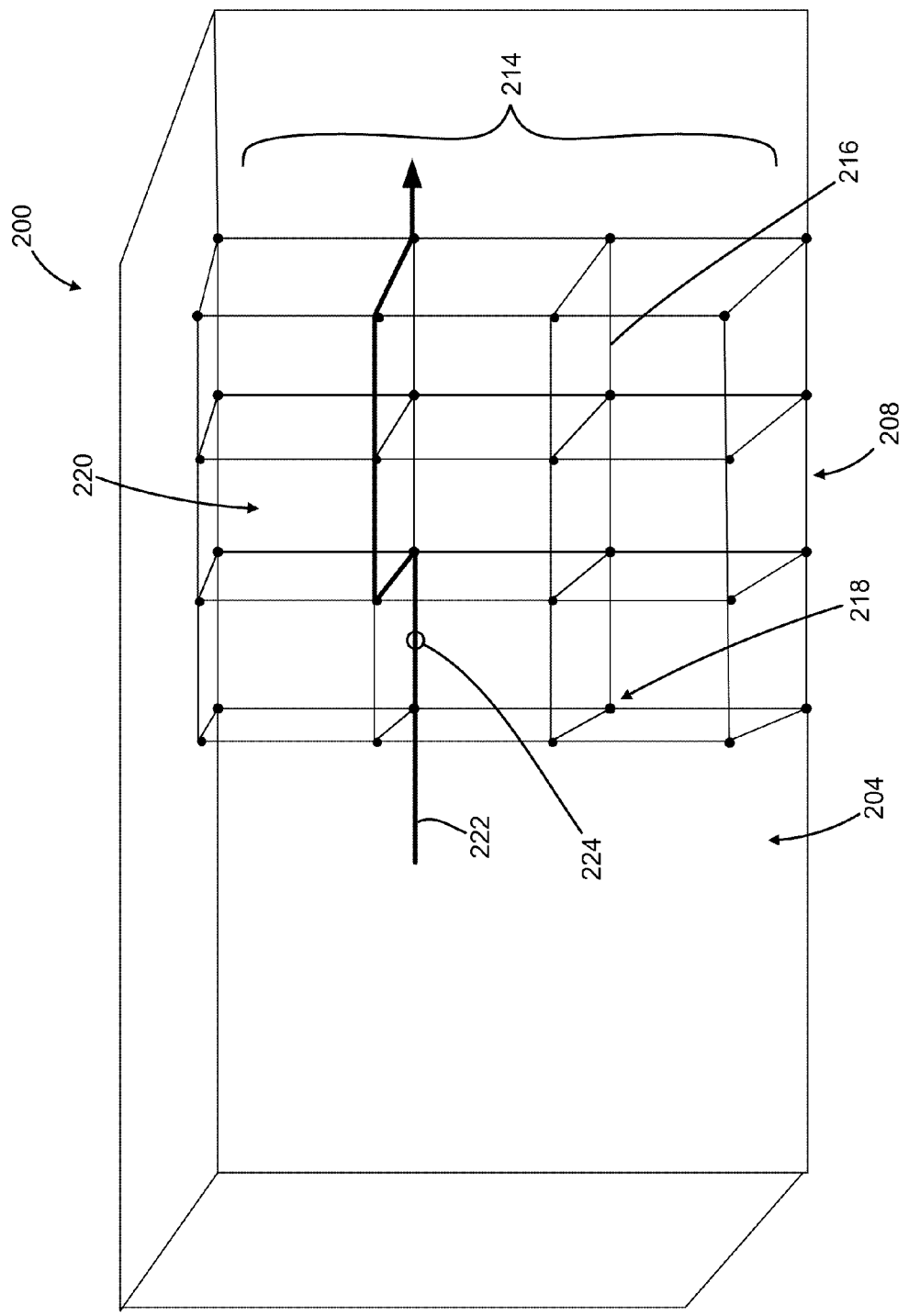
FIG. 2 is a perspective, schematic view of another exemplary embodiment of a stimuli-responsive product.
Figure 3:
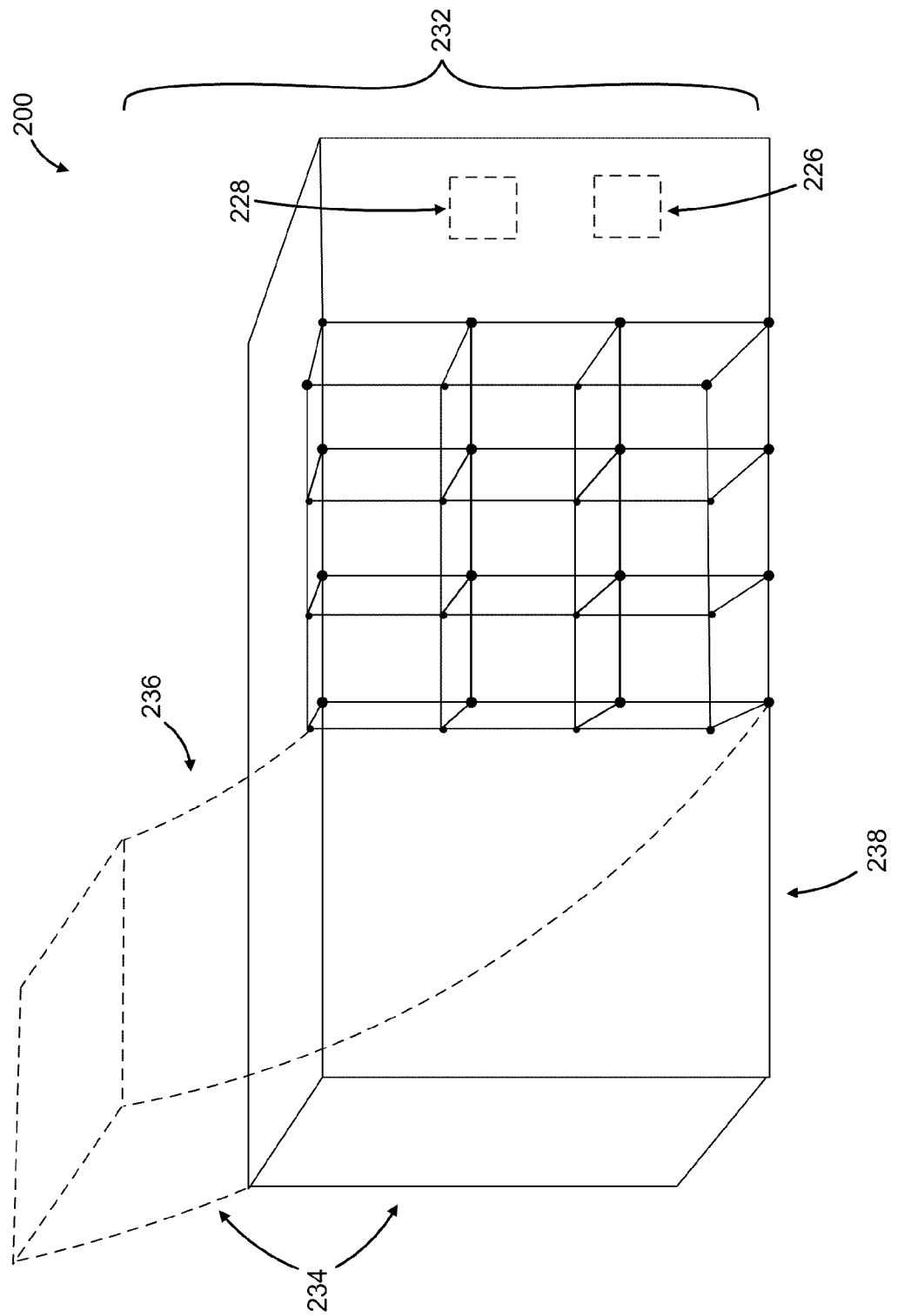
FIG. 3 is another perspective, schematic view of the stimuli-responsive product of FIG. 2.

FIGS. 2-3 depict an exemplary embodiment of a product 200 that is made in accordance with such concepts. Like numerals are used to identify like components as between FIGS. 1-3, except that the numerals are increased by 100 (e.g., 100 in FIG. 1 is now 200 in FIGS. 2 and 3). By way of example, and with reference first to FIG. 2, the product 200 comprises a composition 202 with a first or matrix component 204 and a second or filler component 208 dispersed in and intermixed with the matrix component 204 to form a percolating fiber network 214. The fiber network 214 comprises one or more fiber(s) 216 and includes a plurality of nodes 218 where adjacent fiber(s) 216 are in contact with one another.

Integration of the fiber(s) 216 and the nodes 218 forms a plurality of interstitial voids 220 or gaps within the fiber network 214 where material such as the matrix component 204 is found. The fiber(s) 216 and the nodes 218 also form various stimuli paths, generally denoted by the numeral 222. The stimuli paths 222 describe the various paths that traverse the product 200 and through which stimuli are conducted. An interface 224 is formed by each of the stimuli paths 222, encircling in one example each of the fiber(s) 216. The interface 224 defines the area of contact between the matrix component 204 and filler component 208.

As best depicted in FIG. 3, in one embodiment, the product 200 comprises a first electrode 226 and a second electrode 228 (e.g., "the electrodes"). The product 200 is characterized by a form factor 230, shown generally as a sheet or film 232. The film 232 has a plurality of shapes 234 including a first or fixed shape 236 and a second or stimulated shape 238.

The form factor 230 can take a variety of shapes and forms. For example, the film 232 can be rolled and/or folded into a rod, cylinder, cube, sphere, or block. In other constructions the fiber network 214 is formed about a sacrificial material such as to form a cylinder, where the sacrificial material is thereafter removed to form the hollow center of a tube. Sheets and films such as the film 232 can be flexible, compressible, and resilient. In the present example, the film 232 is characterized by a length L, a width W, and a thickness T. The length L and width W may be constrained in some embodiments by the manufacturing processes and techniques selected to build the fiber network 214. The thickness T is from about 0.001 mm to about 1 mm. In other embodiments, the thickness T is defined as a multiple of the average diameter of the fiber(s) 216. Multiples contemplated are from about 5 to about 20, with the thickness T in one construction of the film 232 being at least about 10 times the average diameter of the fiber(s) 216.

The fiber(s) 216 are conductive so that stimuli, e.g., electrical stimuli, are conducted between the electrodes via the stimuli paths 222. Transmission of electrical stimuli causes thermal heating of the matrix component 204. This heating occurs at the interface 224 such as by conduction of heat from the fiber(s) 216 into material of the matrix component 204 adjacent the fiber(s) 216. Thermal heating causes changes among and between the shapes 234. The fixed shape 236 is indicative of conditions where the outside stimulation is not present (or limited) such as when voltage is removed and/or reduced as seen across the electrodes (e.g., the electrodes 226, 228). The stimulated shape 238 on the other hand occurs as a result of outside stimulation (e.g., the electrical stimuli) being applied to the product 200.

The fiber(s) 216 are constructed to maximize the interconnectedness of the fiber network 214 such as by increasing the number of nodes 218. Highly interconnected structures have improved conductivity because there is available a large number of stimuli paths 222 through which stimuli, e.g., electrical stimuli, can pass. This structure, in turn, increases the rate at which thermal heating will occur by providing more conductive paths and by forming conductive paths that are more directly, or more linearly, arranged as between the first electrode 226 and the second electrode 228. Improved linearity and the large number of nodes 218 are beneficial because it lowers the overall resistance of the fiber network 214. Networks such as the fiber network 214 with lower resistance require less power to activate the shape-memory properties of the matrix component 204.

As mentioned in the previous section above, the fiber(s) 216 can include nanofibers and/or a nanofiber component (e.g., the nanofiber component 110 of the Provisional Application). In one embodiment the fiber(s) 216 have an average diameter of less than about 500 nm. Other embodiments of the product 200 are contemplated in which the average diameter is from about 50 nm to about 200 nm. The use of such small fibers is beneficial because it provides the interface 224 with a large surface area at which contact with the matrix component 204 is made. The large surface area promotes effective thermal heating and, consequently, rapid activation of the shape-memory properties of the matrix component 204. As discussed in the Experimental Results below, in one embodiment electrically-triggered recovery (e.g., from the first shape 236 (curled) to the second shape 238 (flat)) is at least about 100% faster than comparable, conventional devices that utilize discrete fillers and related material.

The interconnectedness of the product 200 can be characterized variously, and in one example the interconnectedness is defined by the density of the fibers(s) 216 and/or nodes 218. In connection with the present example, the density of the fiber(s) 216 is at least about 1 vol. % for a volume of dimensions 1 cm×1 cm×1 cm. In another example, the interconnectedness is characterized by the conductivity and/or resistivity of the fiber network 214. By implementing the concepts described herein, it is contemplated that the conductivity is at least about 0.1 S/cm, and more particularly from about 0.2 S/cm to about 0.3 S/cm.

The product 200 is also characterized by the vol. % of each of the matrix component 204 and the filler component 208. Embodiments of the product 200 are contemplated where the vol. % of the matrix component 204 is at least about 90% of the total volume of the product 200. However, although the filler component 208 makes up a small percentage (e.g., less than about 10%) of the total volume of the product 200, construction of the fiber(s) 216 and the resulting fiber network 214 provide sufficient conductivity to permit activation of the shape-memory properties when electrical stimuli is present. In other embodiments, the vol. % of the matrix component 204 is from about 2% to about 10% of the total volume of the product 200.

Various materials for each of the matrix component 204 and the filler component 208 were discussed above in connection with the Provisional Application. Generally the composition 202 comprises a shape memory material (e.g., the matrix component 104, 204) and a conductive material (e.g., the filler component 108, 208). This combination promotes activation of the shape-memory properties as disclosed herein.

Additional materials for use as the matrix component 204 include, but are not limited to, acrylic and methacrylic cross-linked networks, styrene-acrylic copolymer networks, styrene, methacrylic networks, polycaprolactone networks, poly (glycolide-co-lactide) (PLGA) copolymer network, glassy or semicrystalline networks with a softening transition above room temperature, such as described in C. Liu, H. Qin, and P. T. Mather, "Review of Progress in Shape Memory Polymers," invited feature article *J. Mater. Chem.* 14, 1543-1558 (2007), and combinations, derivations, variations, and compositions thereof.

Additional materials for use as the filler component 208 include, but are not limited to, graphite, carbon black, silver, gold, copper, or intrinsically conductive polymers such as poly(alkyl thiophene), poly(acetylene), poly(pyrrole), and combinations, derivations, variations, and compositions thereof.

Figure 4:
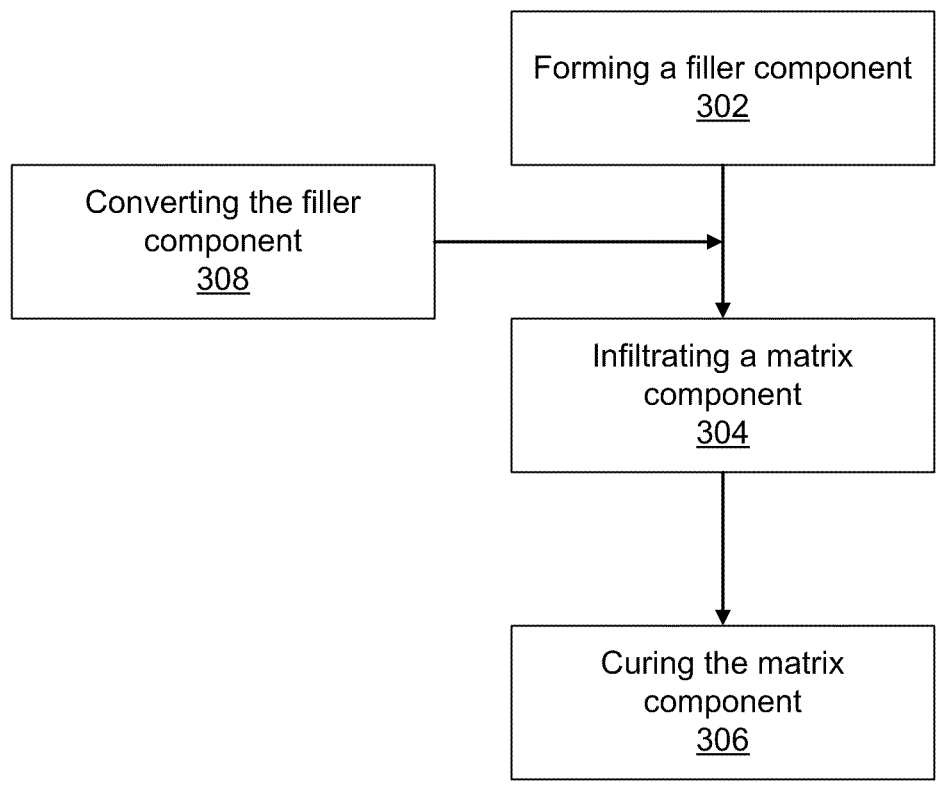
FIG. 4 is a flow diagram of an exemplary method of manufacturing embodiments of a stimuli-responsive product such as the stimuli-responsive product of FIGS. 1-3.
Figure 5:
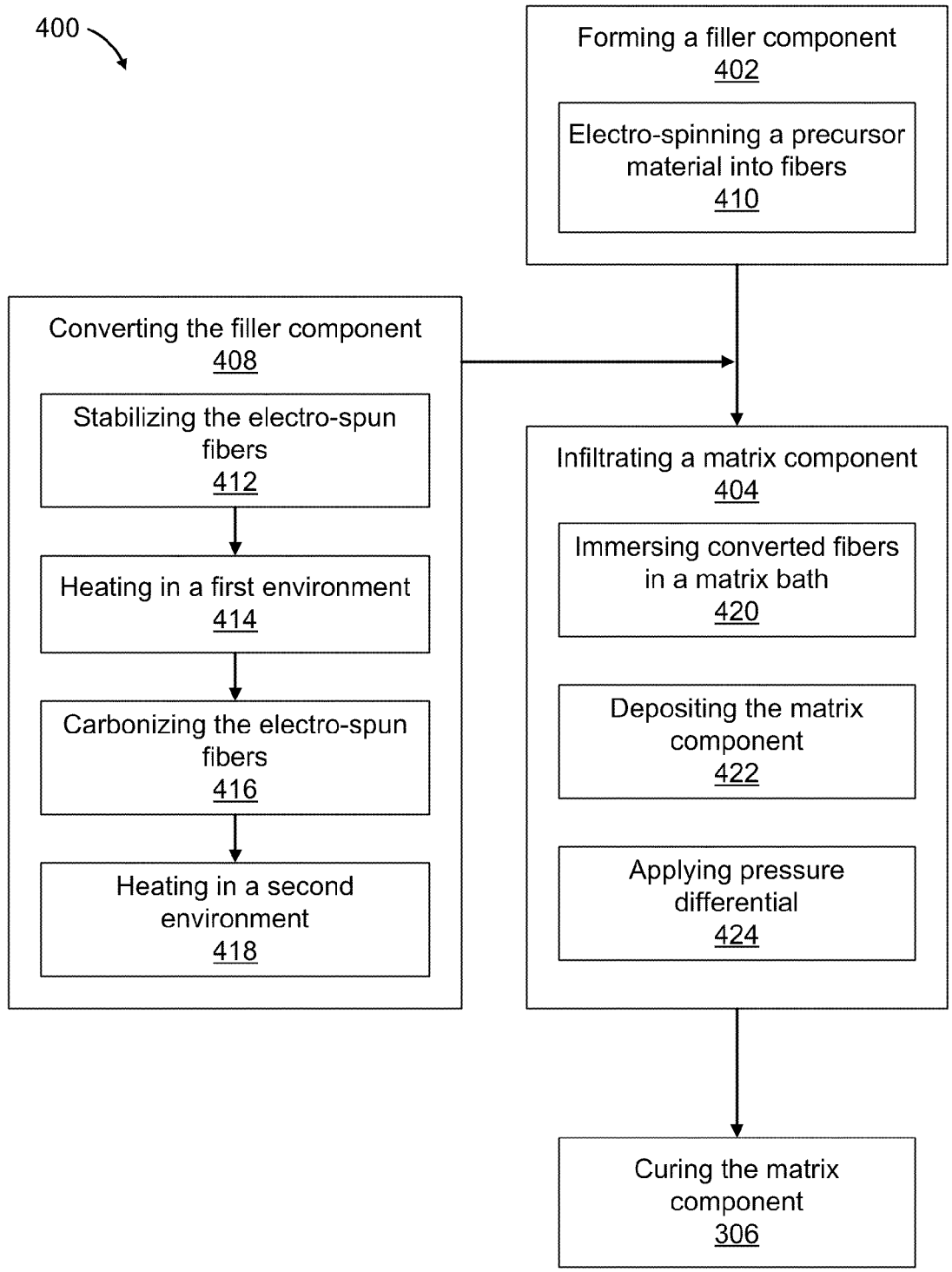
FIG. 5 is a flow diagram of another exemplary method of manufacturing embodiments of a stimuli-responsive product such as the stimuli-responsive product of FIGS. 1-3.

With reference now to FIGS. 4 and 5, as well as to FIGS. 2-3, construction of the product 200 (and also the product 100 (FIG. 1)) is accomplished using as an "inside-out" approach (noted also in the Provisional Application). That is, in one example the matrix component 204 is disposed or otherwise integrated after the fiber network 214 is formed. Method 300 (FIG. 4) and method 400 (FIG. 5) embody at least two example of this approach. The method 300 comprises, at block 302, forming the filler component, at block 304, infiltrating a matrix component into the filler component and, at block 306, curing the matrix component. In one embodiment, the method 300 also includes, at block 308, converting the filler component such as to improve the conductivity of the resulting fiber network.

Forming the filler component (e.g., at block 302) can utilize a variety of manufacturing techniques, which are selected to achieve the level of interconnectedness and/or other features of the fiber network 214. Electro-deposition processes are compatible with these goals. For example, electro-spinning is useful to generate nano-scale fibers and, more particularly, fibers with dimensions and features of the fibers discussed above. In one example, the electro-spinning process is used to create the fiber network 214 as a single, continuous, nonwoven fiber out of one or more precursor materials (e.g., PAN). Folding, overlapping, and dispersal of the nonwoven fiber causes the nodes 218 to be randomly and intermittently dispersed throughout the fiber network 214.

In one example, the fiber network 214 is constructed before the matrix component 204 is introduced such as by electro-spinning the precursor material as a fiber mat onto a substrate. Infiltration (e.g., at block 304) is thereafter implemented such as by depositing the matrix component 204 onto the fiber mat. The matrix component 204 is allowed to penetrate or wick into the interstitial voids 220. This process can be passive, i.e., the properties of materials used for the matrix component 204 and/or the filler component 208 permit sufficient wetting to allow the matrix component 204 to enter the interstitial voids 220. In other example, active infiltration is employed, such as by using positive and/or negative pressure differences to facilitate wicking and movement of the matrix component 204 into the interstitial voids 220.

Properties of the materials, e.g., the matrix component 204, may require that the resulting product 200 is cured (e.g., at block 306). Curing is useful to solidify the matrix component 204 such as by facilitating cross-linking or similar changes in the structure (e.g., the chemical structure) of the materials. Likewise additional steps such as conversion steps (e.g., at block 308) are also useful for this purpose. In one example, conversion of the precursor material may be necessary to enhance, improve, or initiate the conductive properties of the filler component 208. Examples of the conversion are discussed in the Experimental Section below. In the Experimental Results below, PAN fibers are converted into graphite, which has good conductive properties for use as the filler component 208 of the product 200.

Like numerals are used to identify like blocks in the FIGS. 4 and 5. In FIG. 5, the method 400 includes, at block 402, forming a filler component, at block 404, infiltrating a matrix component, at block 406, curing the matrix component and, at block 408, converting the filler component. The method 400 further comprises, at block 410, electro-spinning a precursor material into fibers such as into a fiber mat, wherein the precursor material can comprise materials that are conductive or, in the alternative, can comprise materials that have limited conductivity. The converting step (e.g., at block 408) is used to improve the conductivity. In one embodiment, the method 400 comprises, at block 412, stabilizing the electro-spun fibers such as, at block 414, heating the fibers in a first environment of, e.g., air. The method 400 also comprises, at block 416, carbonizing the electro-spun fibers, wherein in one example the method 400 includes, at block 418, heating the fibers in a second environment, e.g., nitrogen.

Conductive fibers and/or fiber mats with fibers of sufficient conductivity and interconnected with each other for inter-fiber conductive paths can be infiltrated with matrix component (e.g., at block 404). In one embodiment, the method 400 includes, at block 420, immersing the fibers in a matrix bath, which can include in one example resin or related composition that embodies the matrix component (e.g., the matrix component 104, 204). Alternatively or in addition, the method 400 includes, at block 422, depositing the matrix component such as by appropriate deposition techniques that may use a syringe and/or knife blade to provide the matrix component in sufficient quantities and thickness as related to the embodiments contemplated herein. In one embodiment, the method 400 comprises, at block 424, applying a pressure differential such as placing the fiber/matrix composition under positive and/or negative pressure (e.g., vacuum).

Figure 6:
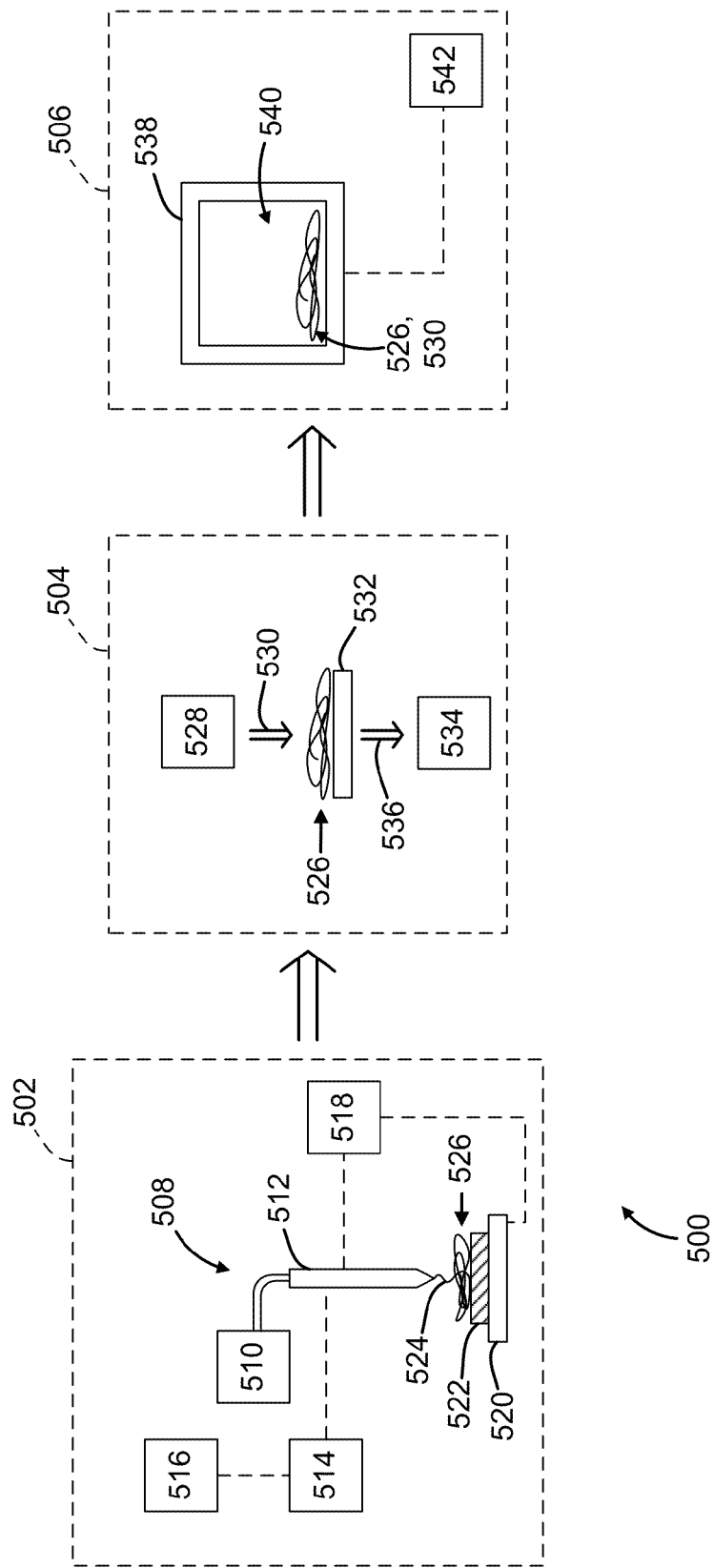
FIG. 6 is a schematic diagram of a manufacturing system to manufacture embodiments a stimuli-responsive product such as the stimuli-responsive product of FIGS. 1-3.

The manufacturing system 500 of FIG. 6 broadly identified the various devices that can be used to implement the methods 300 and 400 and their embodiments. The manufacturing system 500 is useful to create the composition 102, 202, providing in a generic embodiment certain elements for forming the filler component (e.g., the filler component 108, 208), for integrating the matrix component (e.g., the matrix component 104, 204), and for curing and/or solidifying the resulting composition (e.g., the composition 102, 202). The inventors recognize that those artisans skilled in the relative deposition and polymer sciences will understand the more detailed concepts of the elements, therefore details are not necessary but for details found in the Experimental Results below. Moreover, additional elements (although not shown) may be used and implement to achieve various levels of process control and sophistication, with the end results, i.e., embodiments of the product 100, 200 and example of the composition 102, 202, exhibiting features that fall within the various parameters set forth above and contemplated within the scope and spirit of the present disclosure and the Provisional Application.

The manufacturing system 500 comprises an electro-spinning apparatus 502, a matrix deposition apparatus 504, and a curing apparatus 506. The electro-spinning apparatus 502 comprises a spinning unit 508, in which there is incorporated a micro-pump 510, a syringe 512, and a heater 514. The electro-spinning apparatus 502 also comprises a temperature controller 516, which is coupled to the heater 514, and a power supply 518 that is coupled to the syringe 512 so as to cause a voltage at the tip of the syringe 512. A collector 520 such as a grounded metallic plate or metallic roller is also provided. The collector 520 supports a substrate 522, on which is deposited a precursor material 524 in the form of the fiber(s) (e.g., the fiber(s) 116, 216) disclosed and described herein. In one embodiment, and for purposes of the present discussion, the fiber(s) form a fiber mat 526.

The matrix deposition apparatus 504 comprises an applicator 528, such as a syringe and/or knife blade that is configured to introduce a matrix material 530 onto the fiber mat 526. A support 532 is located below the applicator 528 in a position to support the fiber mat 526 and/or the substrate 522. In one embodiment, the matrix deposition apparatus 504 is equipped with a vacuum element 534, which is configured to apply vacuum 536 to facilitate penetration of the matrix material 530 into the fiber mat 526. Alternative configurations of the vacuum element 534 include utilizing a vacuum chamber or similarly situated device in which the fiber mat 526 and the matrix material 530 are submersed in the vacuum environment.

The curing apparatus 506 comprises a heating/cooling device 538 with a cavity 540 and a temperature control unit 542. The cavity 540 is large enough to accommodate at least a portion of the fiber mat 526, which is since interpenetrated with the matrix material 530. The temperature control unit 542 regulates the temperature inside of the cavity 540, thereby causing to solidify the matrix material 530.

Individualized units that embody the electro-spinning apparatus 502, the matrix deposition apparatus 504, and the curing apparatus 506 may be implemented in laboratory or small-scale manufacturing setting. However, the inventors note that automated features may be required to scale-up production. For example, although not shown as part of the manufacturing system 500, various ancillary devices such as motors, gears, belts, conveyors, robots, and control devices may be useful or necessary to integrate the various apparatus and systems identified in FIG. 6 and contemplated herein.

Additional elements may also be implemented as part of the manufacturing system 500 to affix or otherwise "train" the various shapes (e.g., the fixed shape and the stimulated shape) of the product 200.

(3) Experimental Results

Referring now to FIGS. 7-13, the Provisional Application discusses additional details of shape-memory and stimuli-responsive products. Reproduced below is the discussion that provides details in the form of various examples, including Examples 1 and 2 in the EXPERIMENTAL SECTION of the Provisional Application.

These examples are used to illustrate features embodied by the products (e.g., the products 100, 200) and their various derivatives. Material selection, process parameters, and relevant methodology that are highlighted below are not intended to restrict or limit the scope of the present disclosure. Nor do any dimensions, shapes, and other features in these examples. Rather the details are exemplary only and should not be used to limit any of the embodiments of the invention, as it is contemplated that variations depend on the practice and implementation of the concepts discussed herein as well as variety of factors such as, but not limited to, the size, shape, and dimensions of the product, the materials of construction, application and implementation of the product, and the like.

Figure 7:
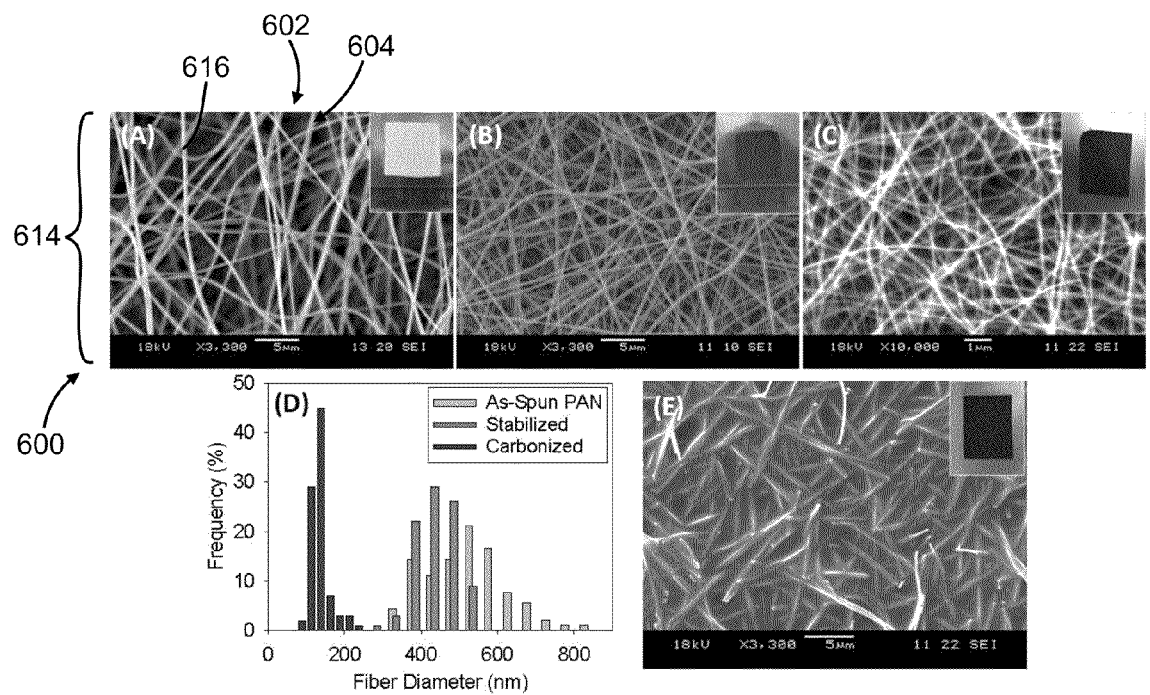
FIG. 7 depicts scanning electron microscopy images of yet another exemplary embodiment of a stimuli-responsive product.
Figure 8:
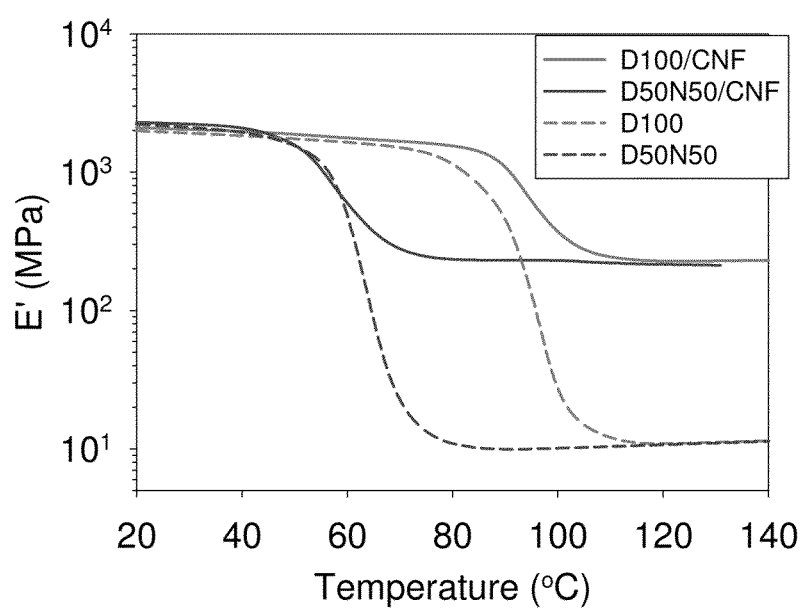
FIG. 8 depicts data collected from dynamic mechanical analysis of a stimuli-responsive product.
Figure 9:
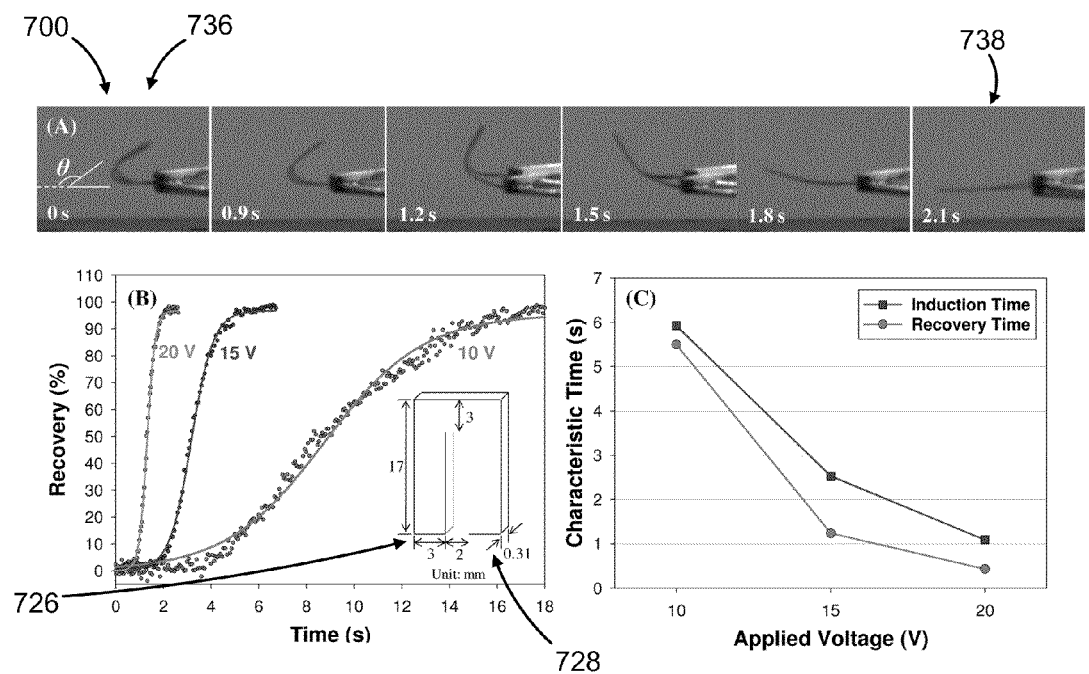
FIG. 9 depicts images of still another exemplary embodiment of a stimuli-responsive product.

The products 100 (FIG. 1) and 200 (FIG. 2) are embodied in Example 1 and FIGS. 7-9. Where applicable like numerals are used to identify like components as between FIGS. 1, 2, and 7-9. For example, FIG. 7 depicts another exemplary embodiment of a product 600. The product 600 comprises a matrix component 602 and a filler component 604, the latter, i.e., the filler component 604, instantiated as a fiber network 614 of fiber(s) 616.

The FIGS. 7-9 are described in the Provisional Application as Appendix B-D in which:

FIG. 7 (Appendix B) depicts data and micrographs of morphological studies of the product 600, where the product 600 comprises Epoxy/CNF shape memory nanocomposites. (A)-(C) are scanning electron microscopy (SEM) images of (A) as-spun PAN, (B) stabilized PAN, and (C) carbonized PAN (CNF) fibers. The fiber diameters were measured by image analysis and the evolving histograms are plotted in (D). (E) shows the SEM image of a fully-cured epoxy/CNF nanocomposite.

FIG. 8 (Appendix C) depicts data from dynamic mechanical analysis (DMA) results of Epoxy/CNF shape memory nanocomposites in comparison with pure epoxy samples of the same formulation.

FIG. 9 (Appendix D) depicts another exemplary embodiment of a product 700 that has a first electrode 726 and a second electrode 728. The product 700 is shown in a plurality of shapes 734, including a fixed shape 736 and a stimulated shape 738. More particularly, as discussed in the Provisional Application there is shown images of electrically-activated shape recovery of Epoxy/CNF nanocomposites. The sample (e.g., the product 600) used comprises D50N50/CNF with a "Π" shaped geometry, schematically shown as the inset in (B). (A) presents time-resolved photographs showing the fast recovery of a D50N50/CNF nanocomposite under a constant DC voltage of 20 V. (B) shows the recovery provides (see Example 1 below) of D50N50/CNF under 3 different voltages of 20 V, 15 V, and 10 V. The voltage was applied at time "0" for all the samples. The solid lines are fit curves using a three parameter sigmoidal function. (C) plots the induction and recovery times (see Example 1 below) for the three voltages studied.

The methods 400 and 500 and the manufacturing system 600 can be used to implement the processes discussed in Example 2 and FIGS. 10-13. For example, Example 2 identifies steps for electro-spinning (e.g., block 302 (FIG. 4), block 410 (FIG. 5)), immersing the resulting mat in resin (e.g., block 304 (FIG. 4), block 418 (FIG. 5)), and curing (e.g., block 306 (FIG. 4), block 418 (FIG. 5)). Example 2 also describes steps for pyrolysis of PAN fibers (e.g., block 308 (FIG. 4), blocks 412, 414, 416, 418 (FIG. 5)). The inventors note that the term "Supporting Information" identifies the images, text, and data presented in FIGS. 10-13 and Example 2 below.

Figure 10:
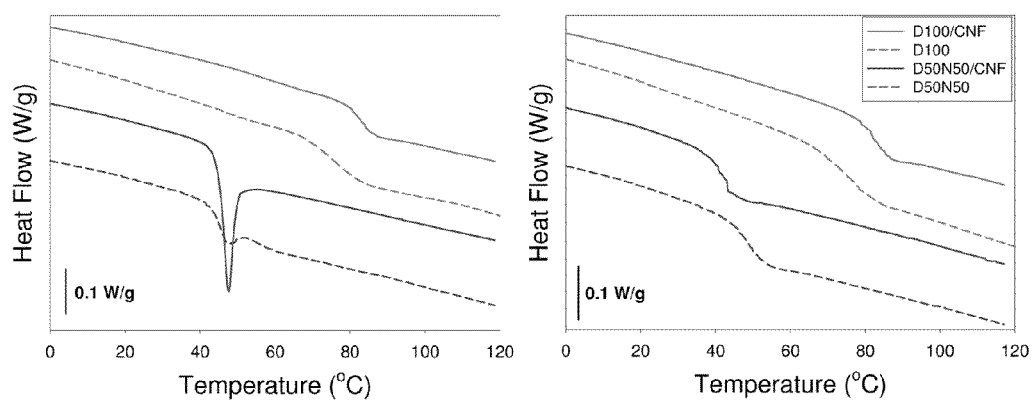
FIG. 10 depicts differential scanning calorimetry thermograms of a stimuli-responsive product.

The FIGS. 10-13 are described in the Provisional Application as Appendix E-H in which:

FIG. 10 (Appendix E) depicts differential scanning calorimetry (DSC) thermograms (left or (A) first heating, right or (B) second heating) of Epoxy/CNF nanocomposites compared with neat epoxy resins. The experiments were conducted on a TA Q200 DSC instrument. All heating/cooling rates were 10° C./min.

Figure 11:
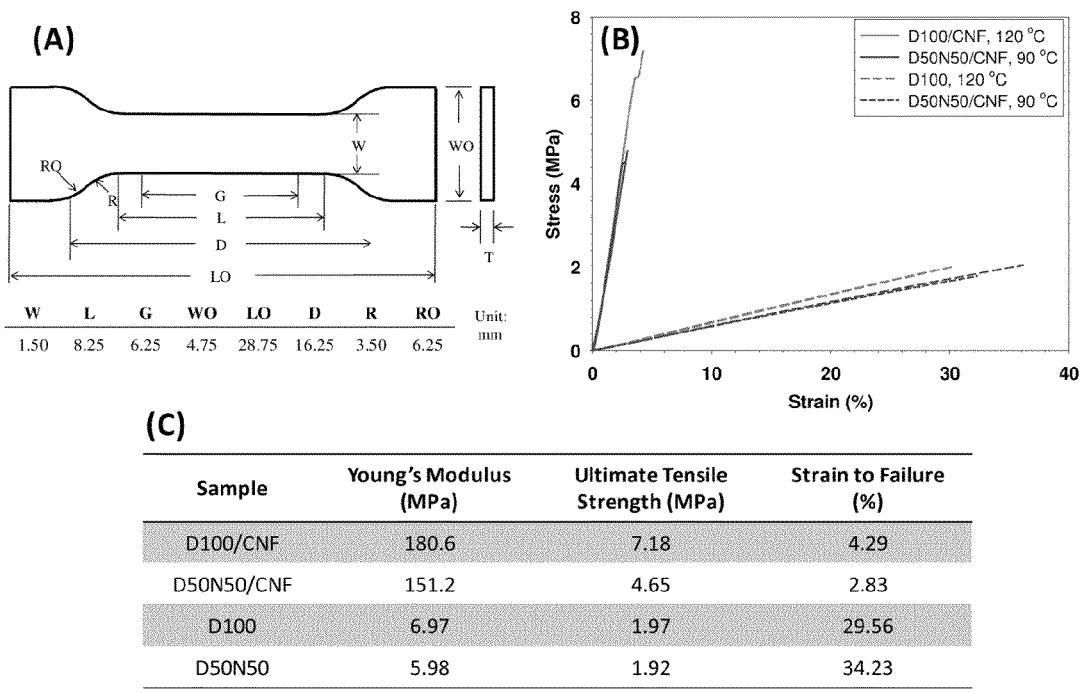
FIG. 11 depicts experimental data from stress-strain tests of a stimuli-responsive product.

FIG. 11 (Appendix F) depicts tensile stress-strain tests of Epoxy/CNF nanocomposites and neat epoxy resins, conducted above the materials' $T_g$'s (120° C. for D100/CNF and D100 and 90° C. for D50N50/CNF and D50N50). Samples were first die-cut into dumbbell-shaped specimens with all dimensions shown in (A). the specimen was then loaded under tension on a TA Q800 dynamic mechanical analyzer and allowed to equilibrate at the prescribed temperature. The specimen was stretched to complete failure at a constant force rate of 0.1 N/min The raw stress-strain curves are shown in (B), noting that the gauge length, G, was used to calculate the tensile strain ($\epsilon = \Delta l/G \times 100\%$). Table (C) summarizes the mechanical properties (Young's modulus, ultimate strength and strain-to-failure) of the four samples tested.

Figure 12:
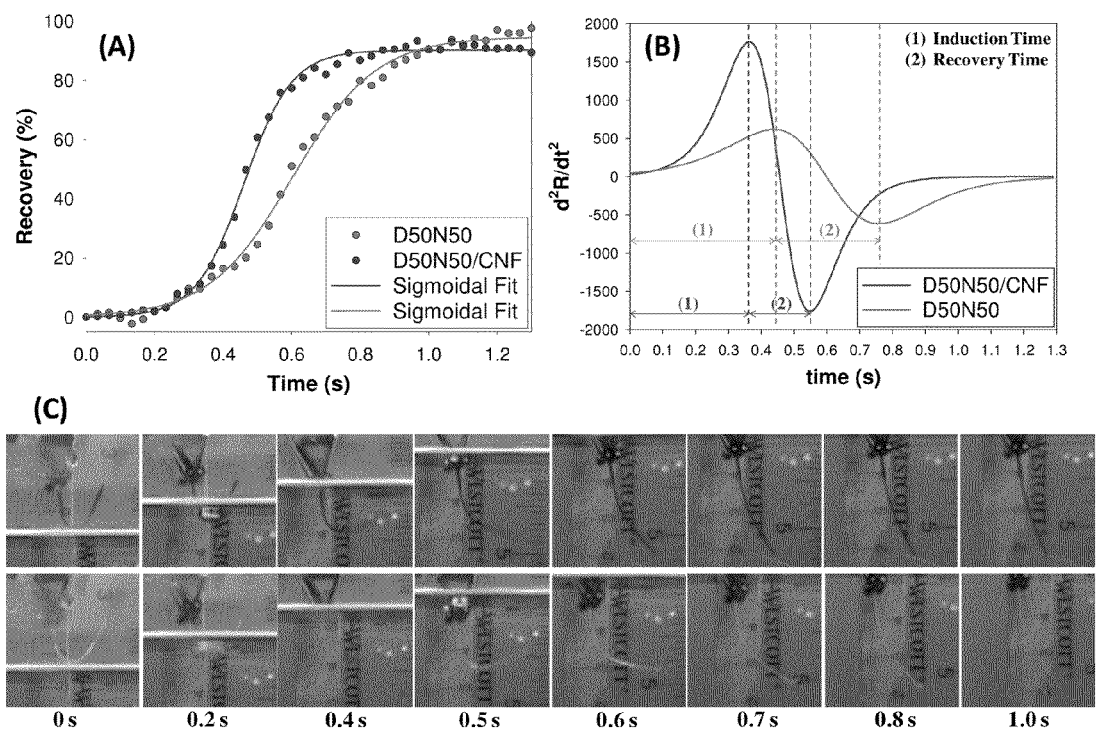
FIG. 12 depicts experimental data and images from isothermal shape recovery experiments of a stimuli-responsive product.

FIG. 12 (Appendix G) depicts isothermal shape recovery experiments of D50N50/PCL and D50N50. The dumbbell geometry shown in Fig. S2(A) (now FIG. 10(A)), with a constant thickness of 0.31 mm was used. The sample was first heated above its Tg, quickly deformed by hand to a bent shape and allowed to cool to room temperature for shape fixing. The shape recovery was triggered by immersing the deformed samples into a hot water bath at 60° C., with digital images taken at constant frame rate of 30 $s^{-1}$. The recovery (%) was calculated based on the change of deformation angle during recovery (detailed in the Example 1 below). (A) shows the time-dependent recovery profiles for D50N50/CNF and D50N50, with both data sets fit using a standard 3-parameters sigmoidal function. Two characteristic times were defined using the second derivative plots of the fit functions, as shown in (B). The induction time (time before rapid shape recovery takes place) is the time between zero (when the sample started contacting the water) and the first peak. The recovery time (time taken for the shape recovery, i.e., from onset to completion) is defined as the time interfacial between the two peaks. From (B) it can be seen that D50N50/CNF recovers much faster than D50N50, in that both the induction time and the recovery time were shortened. As discussed in Example 1 below this is attributed to the increased thermal conductivity due to the incorporation of CNFs. (C) shows the digital images at selected time points for D50N50/CNF (top) and D50N50 (bottom).

Figure 13:
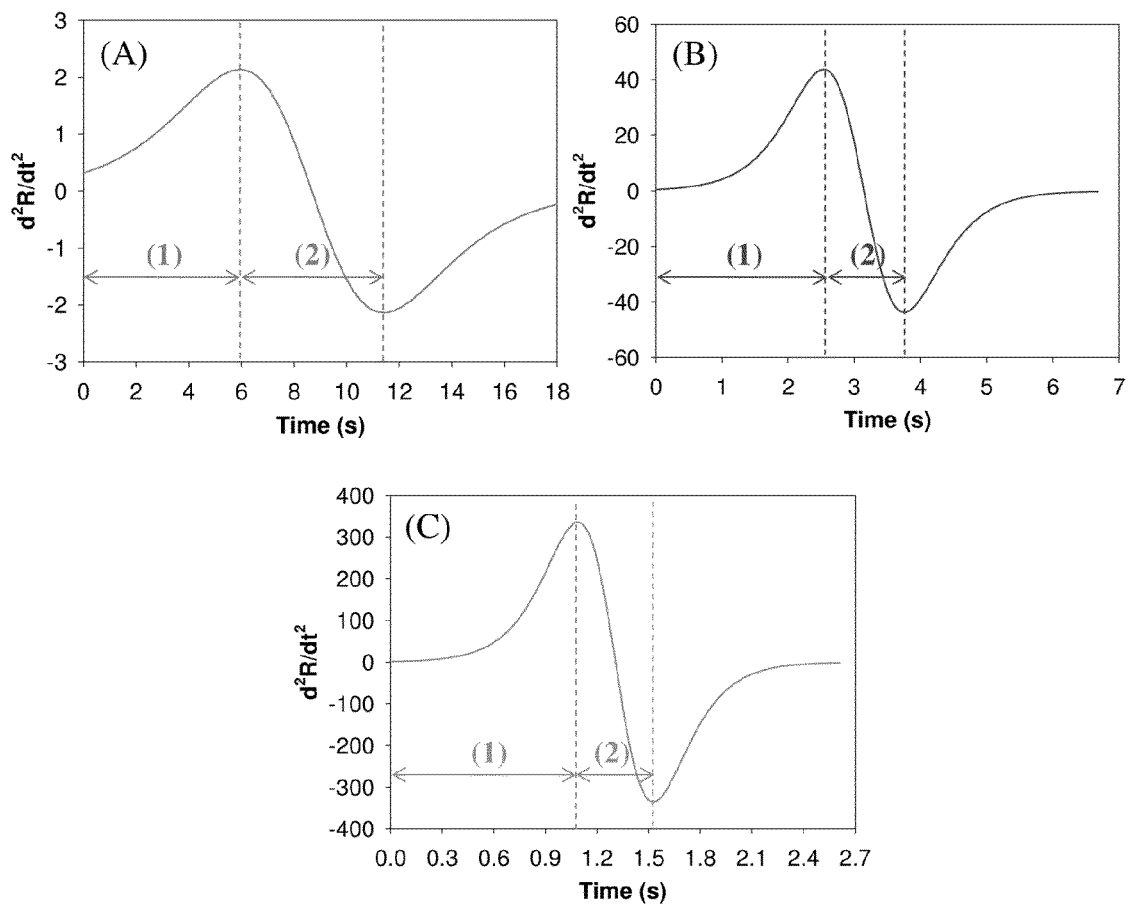
FIG. 13 depicts experimental data for induction time and recovery time for a stimuli-responsive product.

FIG. 13 (Appendix H) depicts the $2^{nd}$ derivative plots of the fit sigmoidal recovery curves (see FIG. 3B (now FIG. 12B)) for D50N50/CNF under different DC voltages of (A) 10 V, (B) 15 V, (C) 20 V. The (1) induction time and (2) recovery time are labeled on each graph.

With continued reference to FIGS. 7-13, the Provisional Application describes various examples of stimuli-responsive products and materials, as illustrated in the excerpt below.

The following non-limiting examples have been carried out to illustrate one or more embodiments of a product (e.g., a stimuli responsive product) made in accordance with the concepts of the present invention:

Example 1

In one embodiment of the product, the CNFs were prepared using poly(acrylonitrile) (PAN) as the precursor.[17, 18] PAN was first electrospun into non-woven fibers with an average diameter of 511.3±105.6 nm (FIG. 1A) [FIG. 7]. The resulting PAN fiber mat was converted to CNFs via a two-step process. The first step, commonly known as the stabilization or pre-oxidization step, involved heating the PAN mat to an intermediate temperature of 280° C. in the presence of air. Although a fair amount of debate still exists,[19] it is generally accepted that PAN undergoes a cyclization reaction and forms a highly conjugated structure, which renders the resulting material both insoluble and inmeltable. Macroscopically the fiber mat changed its color from white to dark brown (FIG. 1A to B) [FIG. 7], and showed a dimensional shrinkage and a weight loss of 20% and 18%, respectively. In the second step or the carbonization step, the stabilized PAN mat was heated to a high temperature of 1000° C. under a nitrogen environment. In this step, the stabilized PAN undergoes dehydrogenation and denitrogenation,[20] and eventually becomes graphite.

The carbonized mat turned completely black (FIG. 1C) [FIG. 7], and showed a dimensional shrinkage and a weight loss (relative to the stabilized PAN mat) of 11% and 57%, respectively.

The morphologies of PAN fibers at different states were characterized using scanning electron microscopy. As shown in FIG. 1A to C [FIG. 7], the fiber structure was well preserved after each step. FIG. 1D [FIG. 7] shows the histograms of fiber diameters (obtained by image analysis) for the as-spun, stabilized, and carbonized PAN samples. It is noted that the average fiber diameter decreased slightly from 511.3±105.6 nm to 411.4±50.4 nm after stabilization, and further reduced to 135.4±24.5 nm after carbonization. The [poly]dispersity of fiber diameters showed a similar trend.

The CNF mat can be incorporated into a SMP matrix. For the latter, the SMP matrix can comprise an epoxy-based SMP system previously reported by Xie and Rousseau.[21] This system can comprise diglycidyl ether of bisphenol-A (DGEBA), neopentyl glycol diglycidyl ether (NGDE), and poly(propylene glycol)bis(2-aminopropyl)ether (Jeffamine D230) of different compositions, and features several advantages including (1) narrow glass transitions easily tailored by copolymerizing DGEBA and NGDE at different ratios, (2) excellent cycle lifetime, and (3) good thermal and chemical stability. For the fabrication of shape memory nanocomposites, two epoxy formulations can be used. The first formulation can comprise DGEBA and Jeffamine D230, and is referred to as D100. The second formulation can comprise half of the DGEBA, and in one particular construction the DGEBA can be replaced by NGDE (therefore the molar ratio of DGEBA/NGDE is 50/50), and is designated as D50N50. Stoichiometric amount (to keep the molar ratio of epoxide groups to amine protons to be one) of Jeffamine D230 was used in both cases.

The shape memory nanocomposites can be fabricated using a relatively simple method. Similar processes have been reported for shape memory elastomeric composites (SMECs),[22] nanofiber ion-exchange membranes[23] and transparent Nylon-4,6/epoxy composites.[24] In the current case, a piece of CNF mat was first kept immersed in the uncured resin mixture for 10 min. The liquid resin could easily wet the CNF mat due to its low starting viscosity. After removing the resin on the surfaces, the resin-impregnated CNF mat was cured at 100° C. for 1 h and post-cured at 130° C. for 1.5 h under a constant small compression. The SEM image of a fully cured Epoxy/CNF nanocomposite (FIG. 1E) [FIG. 7] reveals an anticipated non-woven fiber/matrix morphology in which all the CNFs are evenly distributed in a voids-free epoxy matrix. Unlike previously reported systems with nano-sized fillers, no procedures (strong shear, surface modification, solvent processing, etc.) are needed to achieve uniform distribution and prevent filler aggregation, since the fiber morphology was pre-defined and not altered by the fabrication process. The average CNF weight fraction was measured gravimetrically to be 9.18% with a small standard deviation of 0.33%, indicating good reproducibility of our fabrication protocol. This translates to an average CNF volume fraction of c.a. 4.72%, calculated using the densities of epoxy (1.06 $g/cm^3$) and graphite (2.16 $g/cm^3$).

The thermomechanical properties of one embodiment of the Epoxy/CNF nanocomposites was characterized using dynamic mechanical analysis (DMA). FIG. 2 [FIG. 8] shows the storage modulus (E') as a function of temperature for two nanocomposites (D100/CNF and D50N50/CNF) compared with neat epoxies of the same formulations (D100 and D50N50). For all the samples, a sharp transition in E' corresponding to the glass transition of the epoxy was observed. The incorporation of CNFs showed little effect on the glass transition temperatures ($T_g$'s), which was also shown by the differential scanning calorimetry (DSC) results (Fig. S1 in Supporting Information [FIG. 10]). However, for both formulations, adding CNFs significantly raises the rubbery modulus (E plateau above $T_g$) from c.a. 10 MPa to more than 200 MPa, i.e. a 20-fold increase. This can potentially lead to much higher recovery stresses. Indeed, the stress to failure values of the nanocomposites were over 150% higher than that of the pure epoxy samples, although achieved with a compromise in ultimate strains (Fig. S2 in Supporting Information [FIG. 11]). This makes Epoxy/CNF nanocomposites in embodiments of the present disclosure suited for applications where large recovery stresses are desired.

Both the D100/CNF and D50N50/CNF nanocomposites prepared showed excellent thermally triggered shape memory properties with fast recovery kinetics. One experimental example is given in Fig. S3 (Supporting Information) [FIG. 11] for D50N50/CNF using isothermal water bath (60° C.) as the heating source. The fast recovery speed is attributed to (1) the narrow glass transition of epoxy and (2) increased thermal conductivity due to the incorporation of CNFs.[25] The latter can be seen from the fact that for the same sample dimensions, D50N50/CNF nanocomposite recovered in a much shorter time period than D50N50 (Fig. S3) [FIG. 11].

D50N50/CNF was further utilized to demonstrate the electrically triggered shape memory/actuation behavior. The electrical conductivity of D50N50/CNF was measured to be 30.59±0.81 S/m (corresponding to a volume resistivity of 0.0327±0.0008 Ω*m). This is higher than most previously reported conductive SMPs with comparable filler contents (Supporting Information) [FIGS. 10-13]. This high electrical conductivity allows fast activation of shape recovery by applying a constant DC voltage. Experimentally the recovery process was characterized using a modified bending test method, with the recovery ratio calculated based on the change of deformation angle as a function of time/temperature.[1, 26-28]

A "Π" shaped geometry, shown schematically in the inset of FIG. 3B [FIG. 9] was used to minimize the mechanical constraint imposed by the electrodes[9]. In other words the shape recovery was carried out under a relatively unconstrained condition. FIG. 3A [FIG. 9] shows the recovery of D50N50/CNF from a fixed bent shape to its straight permanent shape under a constant DC voltage of 20 V (images taken at a frame rate of 30 s$^{-1}$ using a digital camera; a continuous movie is available in Supporting Information). Each image was then analyzed using ImageJ to obtain the deformation angle, θ as shown in the first image (0 s) of FIG. 3A [FIG. 9].

The recovery ratio, R, can be defined as:

$$R(\%) = \frac{\theta_i - \theta(t)}{\theta_i - \theta_e} \times 100\%,$$

where $\theta_i$, $\theta(t)$ and $\theta_e$ are the initial deformation angle of the fixed sample, the deformation angle at a given time t, and the deformation angle at the equilibrium/permanent state (in our case $\theta_e=0$), respectively. The recovery experiments were conducted under three different DC voltages (10, 15 and 20 V) and the resulting recovery profiles (R vs. time plots) are shown in FIG. 3B. It can be observed that increasing the DC voltage leads to faster recoveries. With a DC voltage of 20 V, the recovery accomplished in less than 2 s. This feature may be significantly faster than other reported conductive SMPs, which typically recover in 20 to 120 s with applied voltages ranging from 20 to 40 V (Supporting Information). [FIGS. 10-13].

The recovery data was further analyzed to reveal more detailed kinetics information. The data sets shown in FIG. 3B [FIG. 9] were fit using a standard sigmoidal function:

$$R(t) = \frac{R_\infty}{1 + e^{-\left(\frac{t-t_0}{b}\right)}},$$

where $R_\infty$, $t_0$ and b are the three fitting parameters. The fit curves have R values from 0.996 to 0.999 and are shown as the solid lines in FIG. 3B. The 2nd derivatives of the fit curves were then calculated and plotted (Fig. S4 in Supporting Information) [FIG. 13]. All the $2^{nd}$ derivative plots show a similar pattern consisting of two opposite peaks with the same height. Two characteristic times were defined using the $2^{nd}$ derivative plots. The induction time (time before rapid shape recovery takes place) is the time between "0" (when the voltage was applied) and the first (positive) peak on the $2^{nd}$ derivative plot. This corresponds to the initial plateau of the recovery profile (FIG. 3B) [FIG. 9], during which the sample was heated from environmental temperature to its $T_g$. The recovery time (time taken for the shape recovery) is defined as the time interval between the two peaks. This is the time period from the onset (when the material is heated just to its $T_g$) to the completion of the recovery, and corresponds to the section on the recovery profile where R rapidly increased with time (FIG. 3B) [FIG. 9].

The obtained induction and recovery times are plotted for the three DC voltages and shown in FIG. 3C [FIG. 9]. It is observed that for a given DC voltage, the induction time is always longer than the recovery time therefore is more determining on the overall recovery rate. Both the induction and recovery times decay exponentially with applied voltage. Furthermore, the induction times can be used to estimate the initial heating rate, with the assumption that (1) the resistivity has little temperature dependence and (2) shape recovery initiates at precisely the $T_g$, here defined as the onset temperature of E' drop.

The initial heating rate, dT/dt, can then be calculated as:

$$\frac{dT}{dt} = \frac{T_g - T_e}{t_i},$$

where $T_e$ and $t_i$ are the environmental temperature (in this case room temperature) and induction time, respectively. With a $T_g$ of 50.0° C. (determined from FIG. 2 [FIG. 8]) and $T_e$ of 22° C., the initial heating rates were calculated to be 25.7, 11.09 and 4.73° C./s for 20, 15 and 10 V, respectively. Notably these heating rates are quite high and cannot be easily achieved by direct heating.

Example 2

Electrospinning and Pyrolysis of Poly(acrylonitrile) (PAN)

The solution for electrospinning was prepared by dissolving 1 g PAN ($M_w$~150,000 g/mol from Scientific Polymer Products, Inc.) in 10 ml dimethylormamide (DMF). The electrospinning was conducted using a custom-built setup that consists of a high voltage power supply (Agilent E3630A), a syringe pump (KD Scientific) and a rotating drum collector.

An example of the conditions of electrospinning are listed below [in Table 1]:

TABLE 1

| Tip - Collector Distance (cm) | Voltage (kV) | Flow Rate (ml/hr) | Collector Rotating Speed (rpm) |
|---|---|---|---|
| 12 | 12.5 | 1 | 400 |

The as-spun PAN fiber mat was kept in a vacuum oven at room temperature overnight, then at 50° C. for 2 h and finally at 70° C. for 2 h to ensure complete removal of DMF. The dried fiber mat was pyrolyzed via a two-step process. The first step (stabilization) involved heating the fiber mat in a convection oven (Fisher Isotemp 825F) to 280° C. at 2° C./min, followed by an isothermal hold for 3 h under air environment. In the second step (carbonization), the stabilized fiber mat was placed in a tube furnace (Eurotherm Carbolite) under constant nitrogen purge (80 ml/min), heated from room temperature to 1000° C. and then kept isothermal at 1000° C. for 1 h.

Composite Fabrication:

All the chemicals used were purchased from Sigma-Aldrich, Inc. Diglycidyl ether of bisphenol-A (DGEBA) was first preheated at 70° C. The other resin components, including poly(propylene glycol)bis(2-aminopropyl)ether (Jeffamine D230) and neopentyl glycol diglycidyl ether (NGDE), were added and quickly mixed by vigorous hand stirring (~1 min) until a clear, colorless and low-viscosity mixture was obtained. A piece of CNF mat was then put into the resin mixture and kept immersed for 10 min. After removing the extra resin on the surfaces, the impregnated CNF mat was sandwiched between two Teflon-covered glass slides with a Teflon spacer. The thickness of the Teflon spacer was slightly smaller than that of the CNF mat; therefore a constant compression was applied on the CNF mat. The system was cured at 100° C. for 1.5 h and post-cured at 130° C. for 1 h.

Morphological Characterization:

The morphologies of as-spun PAN mat, stabilized PAN mat, carbonized PAN (CNF) mat and Epoxy/CNF composite were characterized by scanning electron microscopy. Samples (except the CNF mat) were sputter coated with gold and examined using a JEOL JSM5600 SEM instrument. A typical voltage of 18 kV was used. Each SEM image was evenly divided into 9 sub-images. For each sub-image, 10 fibers were randomly picked and their diameters measured using ImageJ image analysis program. Therefore, for each sample 90 fibers were measured and the results used to generate the histograms.

Dynamic Mechanical Analysis (DMA):

The thermomechanical properties of Epoxy/CNF composites were characterized using DMA. In each case, a rectangular film was loaded under tension and an oscillatory deformation with an amplitude of 10 μm, a frequency of 1 Hz and a "force track" (ratio of static to dynamic force) or 108% was applied. The temperature was then ramped from −30° C. to 150° C. at a linear rate of 3° C./min. The tensile storage modulus, loss modulus and tangent delta were recorded by the instrument.

Electrically Triggered Shape Recovery Experiment:

The electrical resistance, R, of a rectangular nanocomposite film was first measured using a precision multimeter (FLUKE 8848A). The electrical resistivity ($\rho$) and conductivity ($\sigma$) were calculated as:

$$\rho = R\frac{A}{l},$$

$$\sigma = \frac{1}{\rho}$$

where A and l are the cross-sectional area and distance between two electrodes, respectively. The electrically triggered shape recovery experiment was conducted using a "Π" shaped geometry and a DC power supply (Micronta 0-24 V variable power supply). Digital images were taken using a digital camera (Nikon FinePix S9100) at a constant frame rate of $30^{-1}$.

To summarize, embodiments of the products discussed herein, including embodiments of the shape memory nanocomposite that exhibits unprecedented high-speed electrical actuation capability has been developed by incorporating continuous, non-woven CNFs into an epoxy based SMP matrix. Besides the simple processing and excellent electrical conductivity, this non-woven CNF based filler system simultaneously enhances the recovery stress (by raising the rubbery modulus above $T_g$) and the thermal conductivity of the SMP. Smart devices utilizing this exciting material are currently being designed in our lab. Potential implementations of this material in applications encompassing actuators, sensors and deployable devices.

REFERENCES

[1] A. Lendlein, S. Kelch, *Angewandte Chemie-International Edition* 2002, 41, 2034.
[2] C. Liu, H. Qin, P. T. Mather, *Journal of Materials Chemistry* 2007, 17, 1543.
[3] P. T. Mather, X. F. Luo, I. A. Rousseau, *Annual Review of Materials Research* 2009, 39, 445.
[4] Q. H. Meng, J. L. Hu, *Composites Part a—Applied Science and Manufacturing* 2009, 40, 1661.
[5] D. Ratna, J. Karger-Kocsis, *Journal of Materials Science* 2008, 43, 254.
[6] I. A. Rousseau, *Polymer Engineering and Science* 2008, 48, 2075.
[7] Y. J. Liu, H. B. Lv, X. Lan, J. S. Leng, S. Y. Du, "Review of electro-active shape-memory polymer composite", 2009, p. 69/2064.
[8] J. S. Leng, H. B. Lv, Y. J. Liu, S. Y. Du, *Applied Physics Letters* 2007, 91.
[9] J. S. Leng, W. M. Huang, X. Lan, Y. J. Liu, S. Y. Du, *Applied Physics Letters* 2008, 92.
[10] J. S. Leng, H. B. Lv, Y. J. Liu, S. Y. Du, *Journal of Applied Physics* 2008, 104.
[11] F. K. Li, L. Y. Qi, J. P. Yang, M. Xu, X. L. Luo, D. Z. Ma, *Journal of Applied Polymer Science* 2000, 75, 68.
[12] J. W. Cho, J. W. Kim, Y. C. Jung, N. S. Goo, *Macromolecular Rapid Communications* 2005, 26, 412.
[13] N. G. Sahoo, Y. C. Jung, H. J. Yoo, J. W. Cho, *Composites Science and Technology* 2007, 67, 1920.
[14] I. S. Gunes, G. A. Jimenez, S. C. Jana, *Carbon* 2009, 47, 981.
[15] J. S. Leng, X. Lan, Y. J. Liu, S. Y. Du, W. M. Huang, N. Liu, S. J. Phee, Q. Yuan, *Applied Physics Letters* 2008, 92.
[16] N. G. Sahoo, Y. C. Jung, N. S. Goo, J. W. Cho, *Macromolecular Materials and Engineering* 2005, 290, 1049.

[17] J. Sutasinpromprae, S. Jitjaicham, M. Nithitanakul, C. Meechaisue, P. Supaphol, *Polymer International* 2006, 55, 825.
[18] Z. P. Zhou, C. L. Lai, L. F. Zhang, Y. Qian, H. Q. Hou, D. H. Reneker, H. Fong, *Polymer* 2009, 50, 2999.
[19] Z. Bashir, *Carbon* 1991, 29, 1081.
[20] W. X. Zhang, J. Liu, G. Wu, *Carbon* 2003, 41, 2805.
[21] T. Xie, I. A. Rousseau, *Polymer* 2009, 50, 1852.
[22] X. F. Luo, P. T. Mather, *Macromolecules* 2009, 42, 7251.
[23] J. Choi, K. M. Lee, R. Wycisk, P. N. Pintauro, P. T. Mather, *Macromolecules* 2008, 41, 4569.
[24] M. M. Bergshoef, G. J. Vancso, *Advanced Materials* 1999, 11, 1362.
[25] S. Ganguli, A. K. Roy, D. P. Anderson, *Carbon* 2008, 46, 806.

trical properties and recovery performance is given in Table 2 below. Instead of using direct heating, a DC voltage is applied to the material which generates heat according to Joule's Law and eventually triggers shape recovery. However, in all the cases the conductivity is still relatively low, due to the limited efficiency of discrete fillers in forming percolating conductive networks. This partially results in low recovery rate which makes the material insufficient for high-speed actuation applications. In addition in these cases processing issues such as how to achieve uniform distribution of fillers (prevent aggregation), how to manage high viscosities, etc.

TABLE 2

| Reference | SMP Filler System | Conductivity, $\sigma$(S/m)/ Resistivity, $\rho$ ($\Omega$ * m) | Electrically Triggered Recovery Experiment |
| --- | --- | --- | --- |
| Leng et al., *Appl Phys Lett*, 92, 014104 (2008) | $T_g$ based PU with Ni powders (3-7 μm) | $\sigma$ = 8.21 S/m<br>$\rho$ = 0.1218 $\Omega$ * m<br>with 10 vol-% Ni (chain direction) | Recovered in 90 s under 20 V (composition unknown) |
| Leng et al., *J Appl Phys*, 104, 104917 (2008) | Thermoset PS with CB (mean aggregate size ~4 μm, mean domain size ~18-20 μm) & SCFs (D ~7 μm, L ~0.5-3 mm) | $\sigma$ = 11.22 S/m<br>$\rho$ = 0.0891 $\Omega$ * m<br>with 5 wt-% CB & 2 wt-% SCFs | Recovered in 50 s under 25 V same composition as left |
| Leng et al., *Appl Phys Lett*, 92, 204101 (2008) | $T_g$ based PU with CB (size not known) & Ni powders (3-7 μm) | $\sigma$ ~10 S/m<br>$\rho$ ~0.1 $\Omega$ * m<br>with 10 vol-% CB & 2 vol-% Ni | Recovered in 120 s under 30 V same composition as left |
| Cho et al., *Macromol Rapid Comm*. 26, 412 (2005) | PCL based PU with MWCNTs (D ~10-20 mm, L ~20 μm) | $\sigma$ ~0.1 S/m<br>$\rho$ ~10 $\Omega$ * m<br>with 5 wt-% MWCNTs | Recovered in 10 s under 40 V same composition as left |
| Sahoo et al., *Macromol Mater Eng*, 290, 1049 (2005) | PCL based PU with PPy coating | $\sigma$ = 9.5 S/m<br>$\rho$ = 0.105 $\Omega$ * m<br>with 20 wt-% PPy | Recovered in 25-30 s under 40 V same composition as left |
| Sahoo et al., *Compos Sci Technol*, 67, 1920 (2007) | PCL based PU with PPy (coating or 200-400 nm particles) & MWCNTs | $\sigma$ = 9.8 S/m<br>$\rho$ = 0.102 $\Omega$ * m<br>with 2.5 wt-% PPy & 2.5 wt-% MWCNTs | Recovered in ~20 s under 25 V Same composition as left |
| Li et al., *J Appl Polyn Sci*, 75, 68 (2008) | PCL based PU with CB (50-90 mm) | $\sigma$ = 8.4 S/m<br>$\rho$ = 0.119 $\Omega$ * m<br>with 30 wt-% CB | Not provided |
| Gunes, et al., *Carbon*, 47, 981(2009) | PCL based PU with CB (size not known), CNFs or ox-CNFs (D ~60-200 nm, L ~30-100 μm) | $\sigma$ ~$10^{-3}$ S/m<br>$\rho$ ~$10^3$ $\Omega$ * m<br>with 7 wt-% CB, CNFs or ox-CNFs | Not provided |
| Luo and Mather (current work) | Epoxy SMP with continuous non-woven CNFs (D = 135.4 ± 24.5 nm) | $\sigma$ = 30.59 ± 0.81 S/m<br>$\rho$ = 0.0327 ± 0.0008 $\Omega$ * m<br>with 9.18 ± 0.33 wt-% (4.72 ± 0.17 vol-%) CNFs | Recovered in <2 s under 20 V same composition as left |

Abbreviations:
PS—polystyrene;
PCL—polycaprolactone;
PU—polyurethane;
CB—carbon black;
SCF—short carbon fiber;
Ni—nickel;
MWCNT—multi-walled carbon nanotube;
PPy—polypyrrole;
CNF—carbon nanofiber;
ox-CNF—oxidized carbon nanofiber;
D—diameter;
L—length|

[26] J. R. Lin, L. W. Chen, *Journal of Applied Polymer Science* 1998, 69, 1563.
[27] J. R. Lin, L. W. Chen, *Journal of Applied Polymer Science* 1998, 69, 1575.
[28] C. Liu, P. T. Mather, Journal of Applied Medical Polymers, 6, 47

(4) Comparative Results

The Provisional Application provides a brief summary of previously reported conductive SMP composites, their elec- The inventors note that for materials and products embodied in the present disclosure (e.g., identified as Luo Mather (current work) in Table 2) the recovery rate is less than 2 s at 20 V. This recovery rate is substantially higher than the next effective material(s) such as identified by Cho et al. *Macromol. Rapid Comm.*, 26, 412 (2005).

(5) Additional Embodiments

A small sample of products and methods are described herein as follows:

A1. A shape-memory product, comprising a filler component having a nanofiber forming a fiber network and a matrix component disposed about the fiber. In one example, the fiber is configured to impart thermal heating to the matrix component in response to an electrical stimulus.

A2. The shape-memory product described in A1, wherein the matrix component comprises epoxy.

A3. The shape-memory product described in A1, wherein the matrix component comprises one or more of diglycidyl ether of bisphenol-A, neopentyl glycol diglycidyl ether, and poly(propylene glycol)bis(2-aminopropyl)ether, and derivatives, variations, combinations, and compositions thereof.

A4. The shape-memory product described in A1, wherein the matrix component comprises diglycidyl ether of bisphenol-A and poly(propylene glycol)bis(2-aminopropyl)ether.

A5. The shape-memory product described in A1, wherein the matrix component comprises diglycidyl ether of bisphenol-A, neopentyl glycol diglycidyl ether, and poly(propylene glycol)bis(2-aminopropyl)ether.

A6. The shape-memory product described in A5, wherein the molar ratio of diglycidyl ether of bisphenol-A and neopentyl glycol diglycidyl ether is about 50/50.

A7. The shape-memory product described in A1, wherein the nanofiber comprises a carbon nanofiber.

A8. The shape-memory product described in A7, wherein the carbon nanofiber comprises graphite.

B1. A shape-memory product, comprising a composition having a fiber network comprising a nanofiber, wherein the composition is configured to change form a first shape to a second shape in response to an electrical stimuli conducted by the nanofiber.

B2. The shape-memory product described in B1, wherein the change occurs in less than 2 seconds and the electrical stimuli is about 20 V.

B3. The shape-memory product described in B1, wherein the composition is formed into a sheet having a thickness of less than about 0.5 mm.

B4. The shape-memory product described in B1, wherein said product exhibits a rubbery modulus from about c.a. 10 MPA to about c.a. 200 MPa.

C1. A method comprising electro-spinning a precursor material into fibers to form a fiber mat, stabilizing the electro-spun fibers, carbonizing the electro-spun fibers, infiltrating a matrix component into the fiber mat, and curing the matrix component.

C2. The method described in C1, further comprising heating the electro-spun fibers in a first environment and in a second environment.

C3. The method described in C2, wherein the electro-spun fibers are heated to a temperature of at least 250° C. in the first environment, and wherein the first environment comprises air.

C4. The method described in C2, wherein the electro-spun fibers are heated to a temperature of at least about 900° C. in the second environment, and wherein the second environment comprises nitrogen at a concentration greater than about 95%.

C5. The method described in C1, further comprising immersing the converted fibers in a matrix bath in which the matrix component is disposed, wherein the converted fibers are immersed for at least about 10 min.

C6. The method described in C1, further comprising depositing the matrix component onto the fiber mat.

C7. The method described in C6, further comprising applying a pressure differential to the fiber mat.

Where applicable it is contemplated that numerical values, as well as other values that are recited herein are modified by the term "about," whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

This written description uses examples to disclose embodiments of the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A product responsive to a stimuli, said product comprising:
   a first component comprising a shape-memory material; and
   a second component comprising a non-woven mat of carbonized polymer nanofibers forming a fiber network disposed in the shape memory material.

2. A product according to claim 1, wherein the shape-memory material comprises epoxy.

3. A product according to claim 1, wherein the nanofibers are electrically conductive.

4. A product according to claim 1, wherein the carbonized polymer comprises carbonized poly(acrylonitrile).

5. A product according to claim 1, wherein the first component and the second component form a composition in which the first component is at least about 90 vol. % of the total volume of the composition.

6. A product according to claim 1, wherein the first component comprises one or more of acrylic and methacrylic cross-linked networks, styrene-acrylic copolymer networks, styrene, methacrylic networks, polycaprolactone networks, poly(glycolide-co-lactide) (PLGA) copolymer network, and combinations thereof.

7. A product according to claim 1, wherein the nanofibers have an average diameter that is less that about 500 rim.

8. A product according to claim 1, wherein the nanofibers comprise a polymer selected from the group consisting of poly(alkyl thiophene), poly(acetylene), poly(pyrrole), and combinations thereof.

9. A product according to claim 1, wherein said product changes from a first shape to a second shape in response to application of the stimuli and changes from the second shape to the first shape in response to removal of the stimuli.

10. A product according to claim 1, wherein the nanofibers are configured to generate heat.

11. A product according to claim 10, further comprising a first electrode and a second electrode, wherein each of the first electrode and the second electrode are in electrical communication with the fiber network so as to conduct an electrical signal stimuli between the first electrode and the second electrode via the network.

12. A product according to claim 11, wherein in response to the electrical stimuli the nanofibers are configured to increase the temperature of said product in excess of a transition temperature of the shape-memory material.

13. A product according to claim 12, wherein the fiber network is configured to raise the temperature of said product past the glass transition temperature in less than 10 s.

14. A product according to claim 1, wherein the resistivity of the fiber network does not exceed about 10 Ohm-cm.

15. A product according to claim 1, wherein the conductivity of the fiber network is at least about 0.1 S/cm.

16. A shape-memory product, comprising:
   a matrix comprising a shape memory material;
   a filler combined with the matrix, the filler comprising a non-woven mat of carbonized polymer nanofibers; and
   a pair of electrodes in electrical communication with the fiber network, wherein the nanofibers are configured to conduct an electrical signal between the electrodes via the fiber network.

17. A shape-memory product according to claim 16 wherein the nanofibers comprise carbonized poly(acrylonitrile).

18. A shape-memory product according to claim 16, wherein the shape-memory material comprises epoxy.

19. A method, comprising:
   forming a filler component comprising a non-woven mat of carbonized polymer nanofibers;
   infiltrating the filler component with a matrix component comprising a shape memory polymer; and
   curing the matrix component.

20. A method according to claim 19, wherein the nanofibers comprise carbonized poly(acrylonitrile).

* * * * *